United States Patent
Yamamoto et al.

(10) Patent No.: US 11,228,261 B2
(45) Date of Patent: Jan. 18, 2022

(54) MOTOR DRIVING CONTROL APPARATUS AND MOTOR DRIVING CONTROL METHOD

(71) Applicant: MINEBEA MITSUMI Inc., Nagano (JP)

(72) Inventors: Katsunori Yamamoto, Iwata (JP); Hiroyuki Kato, Fukuroi (JP)

(73) Assignee: MINEBEA MITSUMI Inc., Nagano (JP)

( * ) Notice: Subject to any disclaimer, the term of this patent is extended or adjusted under 35 U.S.C. 154(b) by 7 days.

(21) Appl. No.: 16/975,190

(22) PCT Filed: Jan. 8, 2019

(86) PCT No.: PCT/JP2019/000215
§ 371 (c)(1),
(2) Date: Aug. 24, 2020

(87) PCT Pub. No.: WO2019/167427
PCT Pub. Date: Sep. 6, 2019

(65) Prior Publication Data
US 2021/0367537 A1    Nov. 25, 2021

(51) Int. Cl.
*H02P 3/12* (2006.01)
*H02P 3/22* (2006.01)
*H02P 27/06* (2006.01)

(52) U.S. Cl.
CPC ............ *H02P 3/22* (2013.01); *H02P 27/06* (2013.01)

(58) Field of Classification Search
CPC .................................. H02P 3/22; H02P 27/06
See application file for complete search history.

(56) References Cited

U.S. PATENT DOCUMENTS 9,246,416 B2 *  1/2016  Ichikawa .................. H02P 3/22
9,889,880 B2 *  2/2018  Mori ....................... H02P 27/06

FOREIGN PATENT DOCUMENTS

JP    01-133583 A    5/1989
JP    01-209973 A    8/1989
(Continued)

OTHER PUBLICATIONS

English translation of the Written Opinion for corresponding International Application No. PCT/JP2019/000215 dated Apr. 16, 2019.
(Continued)

*Primary Examiner* — Muhammad S Islam
(74) *Attorney, Agent, or Firm* — Pearne & Gordon LLP

(57) ABSTRACT

A motor driving control apparatus according to an embodiment includes an interphase short-circuiting unit that is connected to at least two-phase coils of the three-phase coils, and that short-circuits at least a pair of coils among three pairs that are different combinations of two coils of the three-phase coils, in response to a short-circuiting signal; a short-circuiting signal output unit that is connected between the coil and the interphase short-circuiting unit, and that outputs a short-circuiting signal to the interphase short-circuiting unit when an input of the brake control signal is received; and a protecting operation unit that stops the interphase short-circuiting unit short-circuiting the coils, based on a voltage condition of a one-phase coil of the three-phase coils.

6 Claims, 10 Drawing Sheets

(56) References Cited

FOREIGN PATENT DOCUMENTS

| JP | 02-290174 A | 11/1990 |
| JP | 06-060581 A | 3/1994 |
| JP | 2010-028997 A | 2/2010 |
| JP | 2018-014781 A | 1/2018 |

OTHER PUBLICATIONS

International Search Report for corresponding International Application No. PCT/JP2019/000215 dated Apr. 16, 2019.
Written Opinion for corresponding International Application No. PCT/JP2019/000215 dated Apr. 16, 2019.

* cited by examiner

| OPERA-TION MODE | POWER SUPPLY | OUTPUT FROM MOTOR BRAKE COMMAND UNIT | D1 | D2 | SW1 | SW2 | SW3 | SW4 SW5 | BRAKE |
|---|---|---|---|---|---|---|---|---|---|
| A | PRESENT | NO-BRAKE COMMAND SIGNAL (HIGH SIGNAL) | ON | OFF | ON | OFF | OFF | OFF | ABSENT |
| B | PRESENT | BRAKE COMMAND SIGNAL (LOW SIGNAL) | ON | ON | OFF | ON | ON | ON | PRESENT |
| C | ABSENT |  | OFF | OFF | OFF | ON | ON | ON | PRESENT |

MOTOR DRIVING CONTROL APPARATUS AND MOTOR DRIVING CONTROL METHOD

FIELD

The present invention relates to a motor driving control apparatus and a motor driving control method.

BACKGROUND

When a three-phase brushless motor is operated for the purpose of the use as a fan motor, for example, conventionally having been in general use is a technology for short-circuiting coils of the motor by electrically short-circuiting a driving bridge circuit, during a period from when a command for braking the rotation is received, or from when the power supply stops, to when the rotation stops. By short-circuiting the motor coils, and short-circuiting the counter electromotive force generated between the motor coils, the rotation of the motor can be stopped quickly with the use of regenerative braking.

At that time, for a system for short-circuiting the coils to operate, some supply of power is required to short-circuit the motor coils. Therefore, when a braking operation is to be performed at the time of power shut-down, for example, the braking time varies depending on residual charge in the power line. Furthermore, such a system lacks a function for suppressing the rotation caused by a windmill phenomenon (forcible rotation of vanes caused by an external wind), which occurs when there is no power supply.

Conventionally having been known, as a solution to the issues described above, is a brake device that ensures that the braking is in effect after the power supply stops, and that stops the motor as quickly as possible.

Available as an example of a brake device for an electric motor is a device that includes a short circuit provided to a power supply path of the electric motor, and that forces the electric motor to stop by dynamic braking (see Patent Literature 1, for example). The short circuit includes a static induction transistor that is conductive without any voltage, and that short-circuits the short circuit.

Another example of the brake device is a dynamic brake for a motor, the dynamic brake including, in a motor driving circuit that controls driving of the motor using a switching element, for example, a rectifier circuit and an energy consuming unit that is connected to the rectifier circuit (see Patent Literature 2, for example). In the brake device, when the switching element is switched off, the rectifier circuit rectifies a counter electromotive force generated in the power line of the motor, and the energy consuming unit consumes the counter electromotive force rectified by the rectifier circuit, so that the motor is stopped.

Also available is a power supply interruption control circuit for an electric motor, the power supply interruption control circuit including a rectifier circuit that is connected to electromagnetic coils of the electric motor, and a switch circuit (see Patent Literature 3, for example). The switch circuit in the power supply interruption control circuit forms a closed circuit, together with the electromagnetic coils and the rectifier circuit, and is not conductive while the power is being supplied to the electric motor, and conductive when an interruption occurs in the power supply.

CITATION LIST

Patent Literature

Patent Literature 1: Japanese Laid-open Patent Publication No. H1-133583

Patent Literature 2: Japanese Laid-open Patent Publication No. H1-209973

Patent Literature 3: Japanese Laid-open Patent Publication No. 2010-28997

SUMMARY

Technical Problem

However, in the conventional regenerative braking, if application of an external force to the motor persists for a long time, or when a large external force is applied while there is no power supply to the motor, the burdens on the electronic components that are responsible for the regenerative braking function becomes increased.

The present invention is made in consideration of the above, and an object of the present invention is to provide a motor driving control apparatus and a motor driving control method for reducing burdens of an electronic component that is responsible for a regenerative braking function, when the load of a motor increases while there is no power supply to the motor.

Solution to Problem

It is an object of the present invention to at least partially solve the problems in the conventional technology. A motor driving control apparatus according to an embodiment includes a motor driving unit that selectively energizes three-phase coils of a motor, a motor control unit that switches an energizing phase of the coils in a predetermined order, the energizing phase being a phase to which the motor driving unit energizes, by outputting a driving control signal to the motor driving unit, a brake control unit that outputs a brake control signal, an interphase short-circuiting unit that is connected to at least two-phase coils of the three-phase coils, and that short-circuits at least a pair of coils among three pairs that are different combinations of two coils in response to a short-circuiting signal, and a short-circuiting signal output unit that is connected between one-phase coil of the three-phase coils and the interphase short-circuiting unit and, and that outputs a short-circuiting signal to the interphase short-circuiting unit when the brake control signal is received, and a protecting operation unit that causes the interphase short-circuiting unit to release short-circuiting the coils or that suppresses short-circuited current based on a voltage condition of a one-phase coil of the three-phase coils.

Advantageous Effects of Invention

According to one aspect of the present invention, it is possible to reduce burdens of an electronic component that is responsible for regenerative braking function, when the load of a motor increases while there is no power supply to the motor.

DESCRIPTION OF EMBODIMENTS

A motor driving control apparatus and a motor driving control method according to an embodiment will now be explained with reference to some drawings.

First Embodiment

Figure 1:
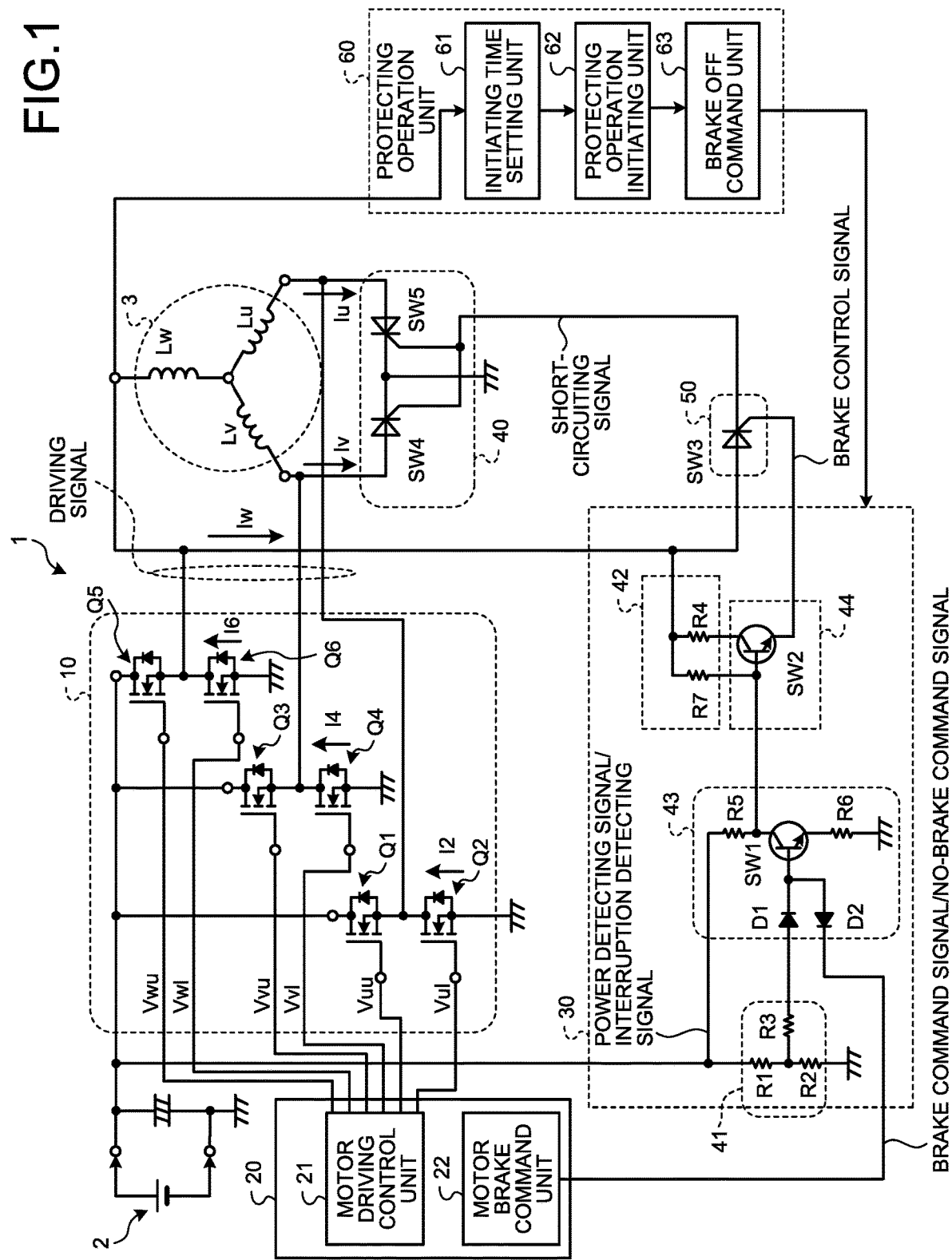
FIG. 1 is a first block diagram illustrating an example of a circuit structure of a motor driving control apparatus according to a first embodiment.

FIG. 1 is a block diagram illustrating an example of a circuit structure of a motor driving control apparatus according to a first embodiment.

As illustrated in FIG. 1, this motor driving control apparatus 1 according to the first embodiment includes a motor driving unit 10, a motor control unit 20, a brake control unit 30, an interphase short-circuiting unit 40, a short-circuiting signal output unit 50, and a protecting operation unit 60. The elements included in the motor driving control apparatus 1 illustrated in FIG. 1 are only a part of the whole, and the motor driving control apparatus 1 may also include any elements other than those illustrated in FIG. 1.

The motor driving control apparatus 1 may be an integrated circuit (IC) device in which the entire motor driving control apparatus 1 is packaged, or a part of the motor driving control apparatus 1 may be packaged in one integrated circuit device. It is also possible for the whole or a part of the motor driving control apparatus 1 to be packaged with another apparatus, in one integrated circuit device.

The motor driving unit 10 selectively energizes three-phase coils Lu, Lv, Lw of a motor 3. The motor control unit 20 switches an energizing phase of the three-phase coils Lu, Lv, Lw in a predetermined order, the energizing phase being a phase to which the motor driving unit 10 conducts current, by outputting a driving control signal to the motor driving unit 10.

The brake control unit 30 outputs a brake control signal. The interphase short-circuiting unit 40 is connected to two-phase coils (the coils Lu, Lv in FIG. 1) of the three-phase coils Lu, Lv, Lw, and short-circuits the coils in each of three pairs (the pair of the coils Lu, Lv, the pair of the coils Lu, Lw, and the pair of the coils Lv, Lw) that are different combinations of two coils of the three-phase coils Lu, Lv, Lw, in response to a short-circuiting signal. The short-circuiting signal output unit 50 is connected between a one-phase coil Lw that is different from the two-phase coils Lu and the interphase short-circuiting unit 40, Lv of the three-phase coils Lu, Lv, Lw, and outputs a short-circuiting signal to the interphase short-circuiting unit 40 when an input of a brake control signal is received. The protecting operation unit 60 causes the interphase short-circuiting unit 40 to release short-circuiting the coils, based on a voltage condition of a one-phase coil (the coil Lw in FIG. 1) of the three-phase coils Lu, Lv, Lw.

As described above, the motor driving control apparatus 1 according to the first embodiment includes: the motor driving unit 10 that selectively energizes the three-phase coils Lu, Lv, Lw of the motor 3; the motor control unit 20 that switches an energizing phase of the three-phase coils Lu, Lv, Lw in a predetermined order, the energizing phase being a phase to which the motor driving unit 10 energizes, by outputting a driving control signal to the motor driving unit 10; the brake control unit 30 that outputs a brake control signal; the interphase short-circuiting unit 40 that is connected to the two-phase coils Lu, Lv of the three-phase coils Lu, Lv, Lw, and that short-circuits coils in each of three pairs that are different combinations of two coils of the three-phase coils Lu, Lv, Lw, in response to a short-circuiting signal; the short-circuiting signal output unit 50 that is connected between the one-phase coil Lw of the three-phase coils Lu, Lv, Lw and the interphase short-circuiting unit 40, and that outputs a short-circuiting signal to the interphase short-circuiting unit 40 when an input of a brake control signal is received; and the protecting operation unit 60 that causes the interphase short-circuiting unit 40 to release short-circuiting the coils, based on a voltage condition of a one-phase coil Lw of the three-phase coils Lu, Lv, Lw. In a motor driving control method according to the first embodiment, the motor driving unit 10 selectively energizes the three-phase coils Lu, Lv, Lw of the motor 3; the motor control unit 20 is caused to switch an energizing phase of the three-phase coils Lu, Lv, Lw in a predetermined order, the energizing phase being a phase to which the motor driving unit 10 conducts current, by causing the motor control unit 20 to output a driving control signal to the motor driving unit 10; the brake control unit 30 is caused to output a brake control signal; the interphase short-circuiting unit 40 connected to the two-phase coils Lu, Lv of the three-phase coils Lu, Lv, Lw is caused to short-circuit coils in each of three pairs that are different combinations of two coils of the three-phase coils Lu, Lv, Lw, in response to a short-circuiting signal; the short-circuiting signal output unit 50 connected between the one-phase coil Lw of the three-phase coils Lu, Lv, Lw and the interphase short-circuiting unit 40 is caused to output a short-circuiting signal to the interphase short-circuiting unit 40 when an input of the brake control signal is received; and the protecting operation unit 60 is caused the interphase short-circuiting unit 40 to release short-circuiting the coils, based on a voltage condition of a one-phase coil Lw of the three-phase coils Lu, Lv, Lw.

With this configuration, the motor driving control apparatus 1 can brake the rotation of the motor using a simple structure without requiring a floating circuit structure. Furthermore, because the short-circuiting signal output unit 50 in the motor driving control apparatus 1 can output the short-circuiting signal using a counter electromotive force generated in the one-phase coil Lv, the motor driving control apparatus 1 can achieve completely independent not-powered braking.

Furthermore, in the condition of operating for short-circuiting the coils in the motor 3, the motor driving control apparatus 1 stops the operation for short-circuiting the coils based on a voltage condition of the one-phase coil Lw of the three-phase coils Lu, Lv, Lw. With this configuration, when the load of the motor 3 (e.g., the external force rotating the vanes of the fan motor) increases while there is no power supply to the motor driving control apparatus 1, it is possible to reduce the burdens of the electronic component that is responsible for the not-powered regenerative braking function.

The motor driving control apparatus 1 according to the first embodiment will now be explained in detail. The motor driving control apparatus 1 is configured to drive the motor 3 with sine-wave driving, for example. The motor driving control apparatus 1 also brakes the rotation of the motor 3.

In the first embodiment, the motor 3 is a three-phase brushless motor, for example, and is a fan motor for rotating a fan not illustrated, for example. The motor driving control apparatus 1 rotates the motor 3 by applying driving current with a sine waveform to the coils Lu, Lv, Lw on an armature of the motor 3. The motor driving control apparatus 1 also brakes the rotation of the motor 3 when it is determined to stop the rotation of the motor 3, or when an interruption occurs in the power supply from a power source 2.

The motor driving unit 10 is an inverter circuit that outputs a driving signal to the motor 3, based on the driving control signal received from the motor control unit 20, and that energizes the coils Lu, Lv, Lw on the armature of the motor 3. The motor driving unit 10 includes pairs of two switching elements in a serial circuit, on both sides of the power source 2 (a pair of switching elements Q1, Q2, a pair of switching elements Q3, Q4, and a pair of switching elements Q5, Q6), with the pairs provided correspondingly to the coils Lu, Lv, Lw of the respective phases (the U phase, the V phase, and the W phase), for example. In this embodiment, the switching elements Q1 to Q6 are metal-oxide-semiconductor field-effect transistors (MOSFETs). In each pair of the two switching elements, the connection point between the switching elements serves as an output end, and the output end is connected to a terminal that is connected to the corresponding coil Lu, Lv, Lw of the corresponding phase of the motor 3. Specifically, the connection point between the switching elements Q1, Q2 serves as an output end that is connected to the terminal of the U-phase coil Lu. The connection point between the switching elements Q3, Q4 serves as an output end that is connected to the terminal of the V-phase coil Lv. The connection point between the switching elements Q5, Q6 serves as an output end that is connected to the terminal of the W-phase coil Lw.

The motor control unit 20 is provided as a micro-computer, for example, and controls the units included in the motor driving control apparatus 1. The motor control unit 20 includes a motor driving control unit 21 and a motor brake command unit 22.

The motor driving control unit 21 generates a driving control signal for driving the motor driving unit 10, and outputs the driving control signal to the motor driving unit 10. Examples of the driving control signal generated thereby include, for example, driving control signals Vuu, Vul, Vvu, Vvl, Vwu, and Vwl, corresponding to the switching elements Q1 to Q6, respectively, included in the motor driving unit 10. Specifically, the driving control signal Vuu is output to the switching element Q1, and the driving control signal Vul is output to the switching element Q2. The driving control signal Vvu is output to the switching element Q3, and the driving control signal Vvl is output to the switching element Q4. The driving control signal Vwu is output to the switching element Q5, and the driving control signal Vwl is output to the switching element Q6. These outputs of the driving control signals cause the switching elements Q1 to Q6 corresponding thereto to perform ON and OFF operations, so that the driving signals are output to the motor 3 and the power is supplied to the coils Lu, Lv, Lw of the corresponding phases of the motor 3. When the rotation of the motor 3 is to be stopped, the switching elements Q1 to Q6 are all switched OFF. For example, when the motor brake command unit 22 outputs a brake command signal for braking the rotation of the motor 3, the motor driving control unit 21 causes all of the switching elements Q1 to Q6 to be switched OFF.

The motor brake command unit 22 generates a brake command signal for causing the brake control unit 30 to brake the rotation of the motor 3, and outputs the brake command signal to the brake control unit 30. When the brake is to be applied to slow the rotation of the motor 3, the motor brake command unit 22 generates a brake command signal that is a Low signal, for example, and, when the brake is not to be applied to slow the rotation of the motor 3, the motor brake command unit 22 generates a no-brake command signal that is a High signal, for example. It is also possible for the generated brake command signal to be a High signal, and for the no-brake command signal to be a Low signal.

The brake control unit 30 outputs the brake control signal to the short-circuiting signal output unit 50. The brake control signal is a signal that is output to short-circuit the coils in each of three pairs that are different combinations of two coils of the three-phase coils Lu, Lv, Lw. As will be described later, in response to the output of the brake control signal to the short-circuiting signal output unit 50, the short-circuiting signal output unit 50 is caused to output a short-circuiting signal to the interphase short-circuiting unit 40, and the interphase short-circuiting unit 40 short-circuits the coils in each of the three pairs mentioned above.

The brake control unit 30 outputs a brake control signal in response to an output of a brake command signal, for braking the rotation of the motor 3, from the motor brake command unit 22, or in response to an interruption of the power supply from the power source 2.

For example, the motor brake command unit 22 outputs a brake command signal when the motor driving control unit 21 stops driving the motor 3. Even when the motor driving control unit 21 stops driving the motor 3, the motor 3 is kept being rotated by inertia. Therefore, to quickly stop the inertial rotation, the motor brake command unit 22 outputs a brake command signal.

When the motor brake command unit 22 outputs a brake command signal, the brake control unit 30 is caused to detect a counter electromotive force generated by the motor 3 being rotated by inertia, and to output a brake control signal using the detected counter electromotive force.

When an interruption occurs in the power supply from the power source 2 while the motor 3 is being driven in rotation, the motor driving unit 10 stops outputting the driving signal, but the motor 3 is kept being rotated by inertia. Therefore, to quickly stop the inertial rotation, the brake control unit 30 is caused to detect the counter electromotive force, and to output the brake control signal using the detected counter electromotive force.

The counter electromotive force is also generated in the coils Lu, Lv, Lw when an external force causes the motor 3 to rotate, e.g., when the fan is rotated by an external wind while the motor 3 is not rotating and power supply from the power source 2 is interrupted. To suppress the rotation of the motor 3 by an external force, the brake control unit 30 brakes the rotation of the motor 3 by detecting an interruption of the power supply and a counter electromotive force generated by an external force, and by outputting a brake control signal using the detected counter electromotive force.

The brake control unit 30 includes a power supply interruption detecting circuit 41, a counter electromotive force detecting circuit 42, a first brake control circuit 43, and a second brake control circuit 44. Although details thereof will be described later, the brake control unit 30 outputs a brake control signal when the power supply interruption detecting circuit 41 detects an interruption of the power supply while the motor driving unit 10 is driving the motor 3. The brake control unit 30 also outputs a brake control signal when the power supply interruption detecting circuit 41 detects an interruption in the power supply, and generation of a counter electromotive force in the coil Lw (an example of a one-phase coil) is detected while the motor driving unit 10 is not driving the motor 3.

The power supply interruption detecting circuit 41 detects an interruption in the power supply from the power source 2. The power supply interruption detecting circuit 41 includes resistor elements R1, R2 in a serial circuit connected in parallel with the power source 2, and a resistor element R3 that is disposed between the serial circuit and the first brake control circuit 43. A source voltage of the power source 2 is divided based on the resistance value of the resistor elements R1, R2. The power supply interruption detecting circuit 41 outputs a power detecting signal (High signal) that is based on the divided voltage to the first brake control circuit 43. When there is an interruption in the power supply from the power source 2, the source voltage drops to zero. In response, the power supply interruption detecting circuit 41 outputs an interruption detecting signal (Low signal) indicating that there is an interruption in the power supply.

The first brake control circuit 43 switches between braking on the motor 3 and no braking on the motor 3 in response to the detection result of an interruption of the power supply from the power source 2, being detected by the power supply interruption detecting circuit 41, or to a brake command signal or a no-brake command signal received from the motor brake command unit 22.

The first brake control circuit 43 includes a switching element SW1, and a first diode element D1 and a second diode element D2. In this embodiment, the switching element SW1 is a transistor, and one end of the switching element SW1 is connected to the power source 2 via a resistor element R5, and the other end is grounded via a resistor element R6. The one end of the switching element SW1 is also connected to the second brake control circuit 44. The anode of the first diode element D1 is connected to the power supply interruption detecting circuit 41, and the cathode is connected to the control terminal of the switching element SW1. The anode of the second diode element D2 is connected to the control terminal of the switching element SW1, and the cathode is connected to the motor brake command unit 22.

For example, when there is no interruption in the power source 2 and the power supply interruption detecting circuit 41 is outputting a power detecting signal (High signal), the first diode element D1 is kept ON. At this time, if the motor brake command unit 22 is outputting a no-brake command signal (High signal) for not braking the rotation of the motor 3, the second diode element D2 is kept OFF. Therefore, the power detecting signal is input to the control terminal of the switching element SW1 via the first diode element D1, and keeps the switching element SW1 to ON.

By contrast, even while the power supply interruption detecting circuit 41 is outputting the power detecting signal, if the motor brake command unit 22 outputs a brake command signal for braking the rotation of the motor 3 (Low signal), the second diode element D2 is switched ON, and the power detecting signal flows into the second diode element D2. Therefore, the power detecting signal is not input to the control terminal of the switching element SW1, and the switching element SW1 is switched OFF.

When the power supply interruption detecting circuit 41 outputs an interruption detecting signal (Low signal), no current is flowing into the first diode element D1, regardless of what the output of the motor brake command unit 22 is, so that no current is input to the control terminal of the switching element SW1. Therefore, the switching element SW1 is switched OFF.

Although details will be described later, when the switching element SW1 in the first brake control circuit 43 is OFF, the second brake control circuit 44 outputs the brake control signal based on the detection result from the counter electromotive force detecting circuit 42. On the other hand, when the switching element SW1 in the first brake control circuit 43 is ON, the second brake control circuit 44 does not output a brake control signal regardless of what the detection result from the counter electromotive force detecting circuit 42 is. By switching ON/OFF the switching element SW1, the first brake control circuit 43 controls the output from the second brake control circuit 44, and switches between braking on the motor 3 and no braking on the motor 3.

The counter electromotive force detecting circuit 42 detects a counter electromotive force generated in the coil Lw. The counter electromotive force detecting circuit 42 includes a resistor element R4 and a resistor element R7. When a counter electromotive force is generated in the coil Lw, the voltage is applied to the control terminal of the switching element SW2 via the resistor element R7. This serves as an operation for detecting a counter electromotive force, and, as a result, the switching element SW2 is switched ON. Part of current Iw flows into the resistor element R4 in the counter electromotive force detecting circuit 42, and a voltage at a level corresponding to the level of the current flowing into the resistor element R4 and the resistance value of the resistor element R4 is generated at each end of the resistor element R4, and causes the brake control unit 30 to output a brake control signal.

When a counter electromotive force is generated in the coil Lw while the first brake control circuit 43 is switching from no braking on the motor 3 to braking on the motor 3, the second brake control circuit 44 outputs a brake control signal using the generated counter electromotive force. The second brake control circuit 44 includes the switching element SW2.

In this embodiment, the switching element SW2 is a transistor, and is provided between the counter electromotive force detecting circuit 42 and the short-circuiting signal output unit 50. The control terminal of the switching element SW2 is connected to the first brake control circuit 43, and is connected to the coil Lw via the resistor element R7.

Let us assume now that the counter electromotive force detecting circuit 42 detects a counter electromotive force generated in the coil Lw while the switching element SW1 in the first brake control circuit 43 is OFF, that is, while supply of power from the power source 2 is interrupted, or when the motor brake command unit 22 is outputting a brake command signal. In such a case, the current Iw flows into the switching element SW2, and switches the switching element SW2 ON. This causes a brake control signal to be output from the second brake control circuit 44 to the short-circuiting signal output unit 50.

By contrast, when the switching element SW1 in the first brake control circuit 43 is ON, that is, when the power is being supplied from the power source 2, and the motor brake command unit 22 is outputting a no-brake command signal, even if the counter electromotive force detecting circuit 42 detects a counter electromotive force generated in the coil Lw, the current flowing through the coil Lw flows into the switching element SW1 in the first brake control circuit 43, via the second brake control circuit 44. Therefore, the current Iw is not input to the control terminal of the switching element SW2, and the switching element SW2 remains OFF. Therefore, no brake control signal is output from the second brake control circuit 44 to the short-circuiting signal output unit 50.

The short-circuiting signal output unit 50 is connected between the coil Lw and the interphase short-circuiting unit 40. The short-circuiting signal output unit 50 outputs a short-circuiting signal to the interphase short-circuiting unit 40 when a brake control signal is input from the second brake control circuit 44. The short-circuiting signal output unit 50 includes a switching element SW3. In this embodiment, the switching element SW3 is a thyristor. The anode of the thyristor is connected to the coil Lw, the cathode is connected to the interphase short-circuiting unit 40, and the gate is connected to the second brake control circuit 44.

The brake control signal output from the second brake control circuit 44 is input to the gate of the switching element SW3. This causes the switching element SW3 to switch ON, and the current Iw is output to the interphase short-circuiting unit 40 as a short-circuiting signal.

The interphase short-circuiting unit 40 is connected to the coils Lu, Lv, and short-circuits the coils (the coils Lu, Lv, the coils Lu, Lw, and the coils Lv, Lw) in each of three pairs that are different combinations of two coils of the three-phase coils Lu, Lv, Lw. The interphase short-circuiting unit 40 includes two switching elements SW4, SW5 that are provided to ends of the coils Lu, Lv, respectively. In this embodiment, the switching elements SW4, SW5 are thyristors. The anodes of the switching elements SW4, SW5 are connected to the coils Lv, Lu, respectively, and the cathodes are grounded. The gates of the switching elements SW4, SW5 are connected to the short-circuiting signal output unit 50 (specifically, to the cathode of the switching element SW3), and a short-circuiting signal is input thereto. When a short-circuiting signal is input, the switching elements SW4, SW5 are switched ON, and short-circuit the coils Lu, Lv, the coils Lu, Lw, and the coils Lv, Lw.

For example, when a positive voltage is generated in the coil Lv, and a negative voltage is generated in the coil Lw, the switching element SW4 and the parasitic diode of the switching element Q6 short-circuit the coils Lv, Lw via the ground. Therefore, current Iv flows into the coil Lv as a short-circuited current, and current I6 flows into the coil Lw as a short-circuited current. Furthermore, when a positive voltage is generated in the coil Lv, and a negative voltage is generated in the coil Lu, the switching element SW4 and the parasitic diode of the switching element Q2 short-circuit the coils Lv, Lu via the ground. Therefore, the current Iv flows into the coil Lv as a short-circuited current, and current I2 flows into the coil Lu as a short-circuited current.

Furthermore, when a positive voltage is generated in the coil Lu, and a negative voltage is generated in the coil Lw, the switching element SW5 and the parasitic diode of the switching element Q6 short-circuit the coils Lu, Lw via the ground. Therefore, current Iu flows into the coil Lu as a short-circuited current, and the current I6 flows into the coil Lw as a short-circuited current. Furthermore, when a positive voltage is generated in the coil Lu, and a negative voltage is generated in the coil Lv, the switching element SW5 and the parasitic diode of the switching element Q4 short-circuit the coils Lu, Lv via the ground. Therefore, the current Iu flows into the coil Lu as a short-circuited current, and current I4 flows into the coil Lv as a short-circuited current.

In the manner described above, the interphase short-circuiting unit 40 is caused to short-circuit the coils in each of three pairs that are different combinations of two coils of the three-phase coils Lu, Lv, Lw. Furthermore, when the short-circuiting signal output unit 50 short-circuits the coils, the parasitic diodes of the switching elements Q2, Q4, Q6 in the motor driving unit 10 become included in a regenerative channel, and operate as a part of the regenerative circuit. Therefore, it is possible to use a simple structure as the circuit for performing independent not-powered braking.

Furthermore, by using the two thyristors in the interphase short-circuiting unit 40, a function as a rectifier circuit and a function as a short circuit can be implemented simultaneously, so that the structure of the interphase short-circuiting unit 40 can be simplified. Furthermore, the interphase short-circuiting unit 40 can be achieved using a highly versatile component such as a thyristor, as disclosed in the embodiment.

The protecting operation unit 60 is enabled to operate while the brake control unit 30 is outputting a brake control signal, and is disabled while the brake control unit 30 is not outputting a brake control signal. With this configuration, it is possible to avoid a situation in which the protecting operation unit 60 is caused to operate immediately after the power supply to the motor 3 stops, and to prevent affecting the brake control of the motor 3 caused by the stoppage of the power supply to the motor 3.

The protecting operation unit 60 outputs a brake OFF command to the brake control unit 30 in order to make the brake control unit 30 stop the output of the brake control signal, when a voltage that is dependent on the duration and the level of the counter electromotive force generated in the coil Lw becomes equal to or higher than a threshold voltage Vth while the brake control signal is being output from the brake control unit 30. With this configuration, it is possible to reduce the load of the interphase short-circuiting unit 40 and the parasitic diodes of the switching elements Q2, Q4, Q6 that are responsible for the not-powered regenerative braking function, when application of an external force rotating the motor 3 persists for a long time.

As illustrated in FIG. 1, the protecting operation unit 60 includes an initiating time setting unit 61, a protecting operation initiating unit 62, and a brake OFF command unit 63. The initiating time setting unit 61 is connected to the one-phase coil Lw of the three-phase coils Lu, Lv, Lw, and outputs a voltage that is dependent on the duration and the level of the counter electromotive force generated in the coil Lw. The protecting operation initiating unit 62 outputs an initiating signal of a protecting operation (brake OFF) to the brake OFF command unit 63 when the voltage output from the initiating time setting unit 61 becomes equal to or higher than a preset threshold voltage Vth1. When the initiating signal is output from the protecting operation initiating unit 62, the brake OFF command unit 63 outputs a brake OFF signal for stopping the output of the brake control signal from the brake control unit 30, to the brake control unit 30. When an output of a brake OFF signal is received from the protecting operation unit 60, the brake control unit 30 stops outputting the brake control signal.

Figure 2:
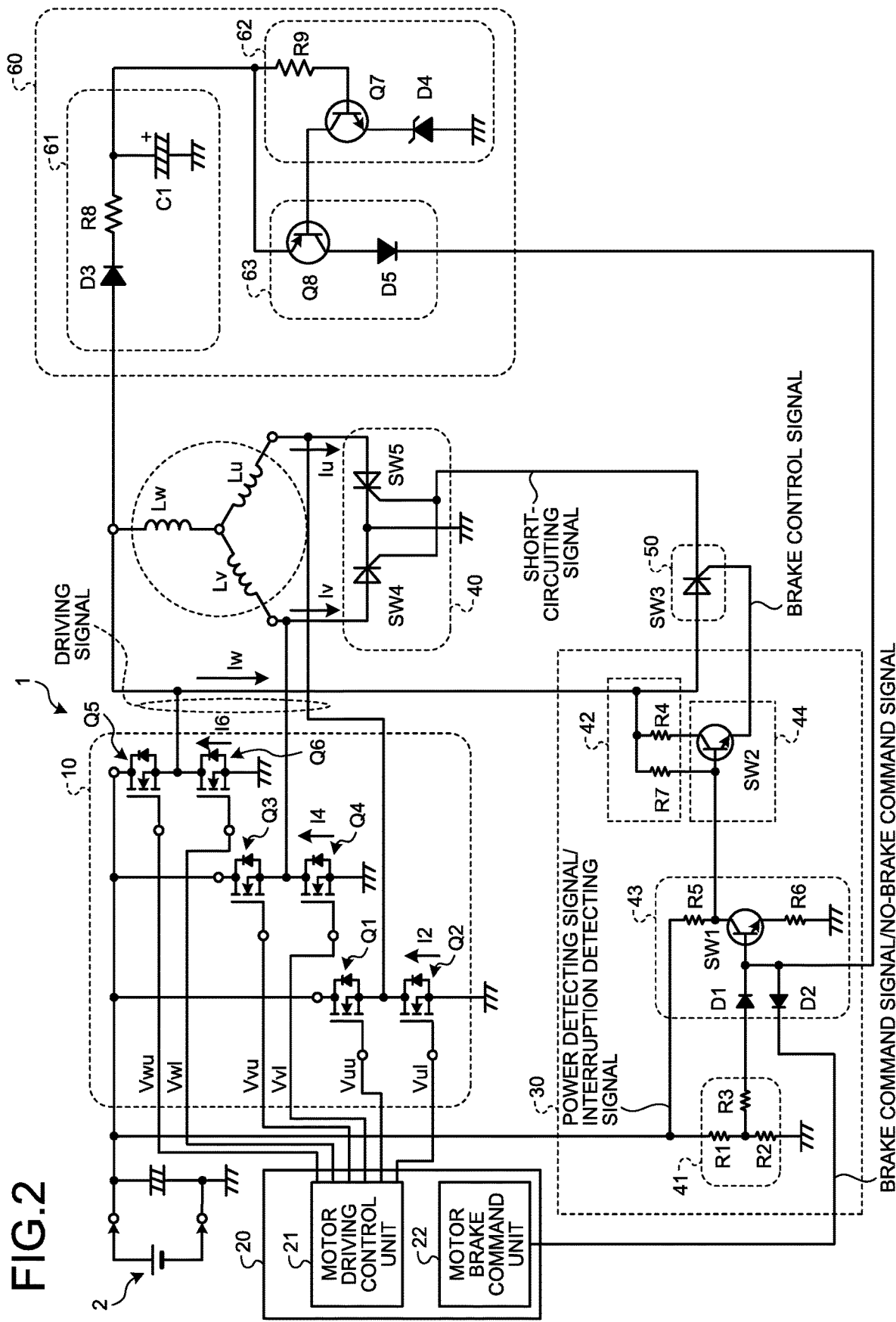
FIG. 2 is a second block diagram illustrating an example of the circuit structure of the motor driving control apparatus according to the first embodiment.

FIG. 2 is a block diagram illustrating an example of a circuit structure of the motor driving control apparatus according to the first embodiment, and illustrates an example of configurations of each of the initiating time setting unit 61, the protecting operation initiating unit 62, and the brake OFF command unit 63. As illustrated in FIG. 2, the initiating time setting unit 61 includes a diode element D3, a resistor element R8, and a capacitor C1. The anode of the diode element D3 is connected to the coil Lw, and the cathode is connected to one end of the resistor element R8. The other end of the resistor element R8 is connected to one end of the capacitor C1. The other end of the capacitor C1 is grounded.

The counter electromotive force generated in the coil Lw in the motor 3 is rectified by the diode element D3, and the rectified counter electromotive force is output to a time-constant circuit including the resistor element R8 and the capacitor C1. The voltage at each end of the capacitor C1 rises based on the time constant determined by the resistor element R8 and the capacitor C1. With this configuration, the initiating time setting unit 61 is enabled to output a voltage that is dependent on the duration and the level of the counter electromotive force generated in the coil Lw. It is possible to adjust the rate at which the voltage output from the initiating time setting unit 61 rises, by adjusting the time constant determined by the resistor element R8 and the capacitor C1. Hereinafter, the voltage output from the initiating time setting unit 61 may be referred to as smoothed voltage.

The protecting operation initiating unit 62 includes a resistor element R9, a switching element Q7, and a Zener diode element D4. One end of the resistor element R9 is connected to the output of the initiating time setting unit 61, and the other end is connected to the control terminal of the switching element Q7. One end of the switching element Q7 is connected to the brake OFF command unit 63, and the other end is connected to the cathode of the Zener diode element D4. The anode of the Zener diode element D4 is grounded.

In the protecting operation initiating unit 62, when the smoothed voltage output from the initiating time setting unit 61 becomes equal to or higher than the threshold voltage Vth1, the switching element Q7 is switched ON, and the switching element Q7 outputs an initiating signal of the protecting operation (brake OFF) to the brake OFF command unit 63. At this time, Vth1=$V_{BE}$+$V_{DZ}$, denoting the ON voltage of the switching element Q7 as "$V_{BE}$", and denoting the Zener voltage of the Zener diode element D4 as "$V_{DZ}$".

The brake OFF command unit 63 includes a switching element Q8 and a diode element D5. The control terminal of the switching element Q8 is connected to the output of the protecting operation initiating unit 62. One end of the switching element Q8 is connected to the output of the initiating time setting unit 61, and the other end is connected to the anode of the diode element D5. The cathode of the diode element D5 is connected to the control terminal of the switching element SW1 in the first brake control circuit 43.

In the brake OFF command unit 63, when an initiating signal is output from the protecting operation initiating unit 62, the switching element Q8 is switched ON. As a result, the brake OFF command unit 63 is caused to output a brake OFF command to the control terminal of the switching element SW1 in the first brake control circuit 43. When the brake OFF command is input to the control terminal of the switching element SW1, the switching element SW1 in the first brake control circuit 43 is switched ON. Once the switching element SW1 in the first brake control circuit 43 is switched ON, the switching element SW2 in the second brake control circuit 44 is switched OFF. As a result of this, the second brake control circuit 44 stops outputting the brake control signal to the short-circuiting signal output unit 50. In other words, when a brake OFF signal is output from the protecting operation unit 60, the brake control unit 30 stops outputting the brake control signal.

In the manner described above, the protecting operation unit 60 stops the output of a brake control signal from the brake control unit 30 at a timing determined based on the duration and the level of the counter electromotive force generated in the coil Lw, while the brake control signal is being output from the brake control unit 30. With this configuration, for example, when application of an external force rotating the motor 3 persists for a long time, it is possible to protect the interphase short-circuiting unit 40 and the parasitic diodes of the switching elements Q2, Q4, Q6 from suffering from an excessive amount of load resultant of the regenerative braking.

The configuration of the protecting operation unit 60 is not limited to that illustrated in FIG. 2, and may be configured in any way as long as a brake OFF command is output at a timing determined based on the duration and the level of the counter electromotive force generated in the coil Lw. Furthermore, the protecting operation unit 60 may also have a configuration for outputting a brake OFF command at a timing determined based only on the duration of the counter electromotive force generated in the coil Lw. For example, it is possible to use a configuration in which a voltage limiting circuit is provided between the cathode of the diode element D3 and the one end of the resistor element R8, and a brake OFF command is output at a timing determined based only on the duration of the counter electromotive force.

Furthermore, the protecting operation unit 60 operates while a brake control signal is being output from the brake control unit 30, as described above. In the protecting operation unit 60, a switching element not illustrated is provided between the coil Lw and the initiating time setting unit 61. A control terminal of the not-illustrated switching element is connected to the output of the brake control unit 30, and connects the coil Lw to the initiating time setting unit 61 when an input of the brake control signal is being received. With this configuration, the protecting operation unit 60 operates when a brake control signal is being output from the brake control unit 30. The protecting operation unit 60 may be configured in any way as long as the protecting operation unit 60 is enabled to operate while a brake control signal is being output from the brake control unit 30, and the configuration for switching to enable and to disable the protecting operation unit 60 is not limited to the example described above. For example, the configuration may include a switching element for short-circuiting both ends of the capacitor C1, and the switching element may be switched OFF when a brake control signal is being output from the brake control unit 30.

Figures 3, 4:
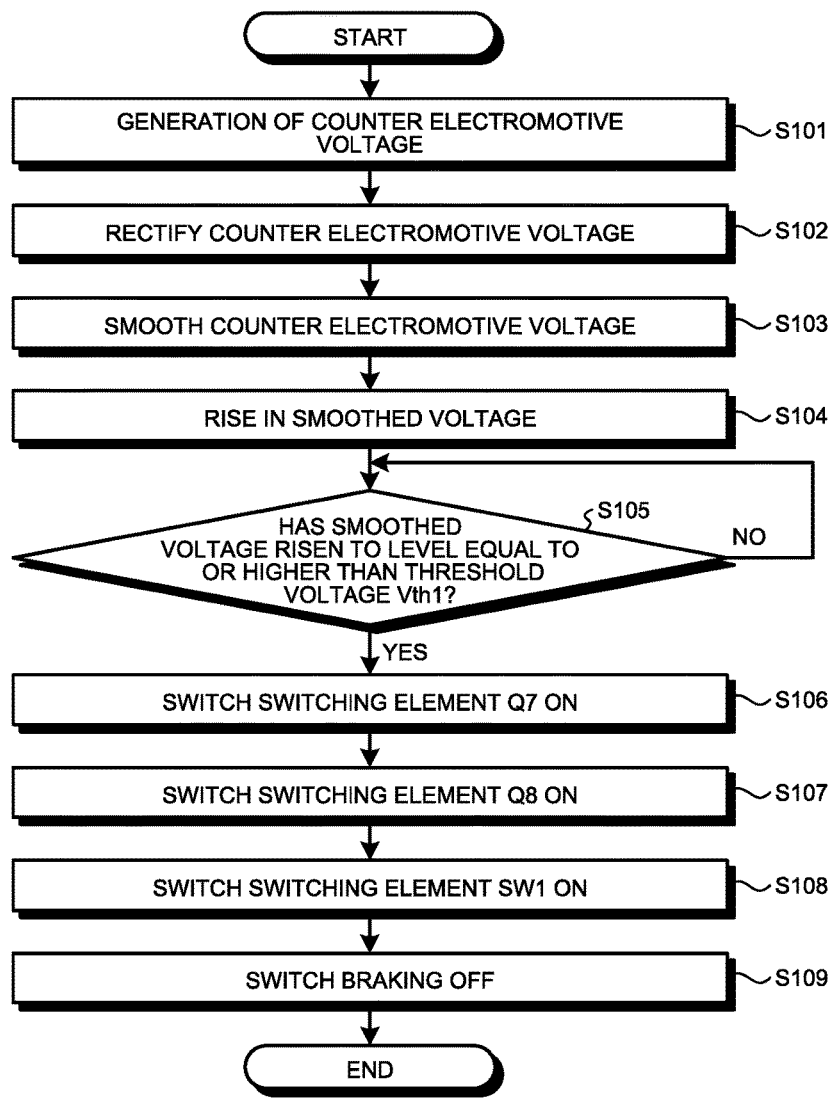
FIG. 3 is a schematic diagram for explaining operation modes of the motor driving control apparatus according to the first embodiment.
FIG. 4 is a flowchart for explaining an example of an operation sequence performed by a protecting operation unit in the motor driving control apparatus according to the first embodiment.

Operation modes of braking operations performed by the motor driving control apparatus 1 will now be explained with reference to FIGS. 1 to 3. FIG. 3 is a schematic diagram for explaining operation modes of the motor driving control apparatus 1 according to the first embodiment. As described above, the motor driving control apparatus 1 brakes the rotation of the motor 3 when an interruption occurs in the power supply from the power source 2, or when the motor brake command unit 22 outputs a brake command signal. The braking-related operations performed by the motor driving control apparatus 1 are classified into those in three operation modes A to C, as illustrated in FIG. 3.

To begin with, when the motor control unit 20 rotates the motor 3 without braking (operation modes A), as illustrated in FIG. 3, the motor driving control apparatus 1 is receiving the power supply from the power source 2, and a no-brake command signal (High signal) is being output from the motor brake command unit 22. In such a case, the first diode element D1 is switched ON, and the second diode element D2 is switched OFF in the first brake control circuit 43, so that the switching element SW1 is switched ON. In this configuration, even if counter electromotive force is generated in the motor 3, the switching elements SW2 and SW3 all remain OFF, so that neither a brake control signal nor a short-circuiting signal is output, and therefore, no braking operation is performed by the motor driving control apparatus 1 (no braking).

Let us now assume that, for example, the motor control unit 20 determines to stop the rotation of the motor 3, thereby causing the motor driving control unit 21 to stop driving the motor 3, and causing the motor brake command unit 22 to apply brake to the motor 3 (operation mode B). In such a case, the motor driving control apparatus 1 is receiving the power supply from the power source 2, and a brake command signal (Low signal) is output from the motor brake command unit 22. In such a case, both of the first diode element D1 and the second diode element D2 are switched ON, and the switching element SW1 is switched OFF. At this time, in case a counter electromotive force is generated in the motor 3, the switching element SW2 is switched ON, and the brake control signal is generated using the counter electromotive force generated in the motor 3. The brake control signal then causes the switching element SW3 to be switched ON, and causes a short-circuiting signal to be generated. This operation causes the switching elements SW4 and SW5 in the interphase short-circuiting unit 40 to be switched ON, and to brake the rotation of the motor 3 (braking).

In the manner described above, when the motor control unit 20 stops driving the motor 3 in rotation, the motor driving control apparatus 1 can brake the rotation of the motor 3 using the counter electromotive force generated in the motor 3 by inertia.

When an interruption occurs in the power supply from the power source 2 to the motor driving control apparatus 1, and the power supply stops (operation mode C), the first diode element D1 and the second diode element D2 are both switched OFF, and the switching element SW1 is switched OFF. At this time, as a counter electromotive force is generated in the motor 3, the switching element SW2 is switched ON, and the brake control signal is generated using the counter electromotive force generated in the motor 3. The brake control signal then causes the switching element SW3 to be switched ON, and causes a short-circuiting signal to be generated. This operation causes the switching elements SW4 and SW5 in the interphase short-circuiting unit 40 to be switched ON, and to brake the rotation of the motor 3 (braking).

In the operation mode C, the motor driving control apparatus 1 brakes the rotation of the motor 3 when an interruption occurs in the power supply from the power source 2, regardless of whether the motor control unit 20 is driving or not driving the motor 3 in rotation. In other words, the motor driving control apparatus 1 brakes the rotation of the motor 3 when an interruption occurs in the power supply from the power source 2, regardless of whether the signal output from the motor brake command unit 22 that was output immediately before the interruption of the power supply is a no-brake command signal or a brake command signal.

Therefore, the motor driving control apparatus 1 can apply brake to the motor 3 being rotated by an external force, when an interruption occurs in the power supply while the motor 3 is not being driven in rotation, for example. In this manner, when the motor 3 is a fan motor, and is installed in a user system, for example, a countermeasure for rotation of the motor, being forced to rotate by an external wind, can be implemented.

In the manner described above, the motor driving control apparatus 1 can brake the rotation of the motor 3, and stop the rotation of the motor 3 more quickly when an interruption occurs in the power supply from the power source 2. Furthermore, because the motor driving control apparatus 1 brakes the rotation using the counter electromotive force generated in the motor 3, a completely independent not-powered braking operation can be achieved, without providing a battery that is separate from the power source 2, even when there is no power supply from the power source 2. Furthermore, because the motor driving control apparatus 1 is responsible for detecting an interruption of the power supply and outputting a brake command signal, it is not necessary to provide a separate external device for detecting the interruption of the power supply and outputting the brake command signal, and it is possible to implement an independent braking system using the motor driving control apparatus 1.

Furthermore, after starting to brake the rotation of the motor 3, the motor driving control apparatus 1 releases braking the rotation of the motor 3 and performs the protecting operation at a timing determined based on the duration and the level of the counter electromotive force generated in the coil Lw. With this configuration, it is possible to avoid a situation in which an external force rotating the motor 3 is kept being applied for a long time, and to protect the interphase short-circuiting unit 40 and the parasitic diodes of the switching elements Q2, Q4, Q6 from suffering from an excessive amount of load resultant of the regenerative braking.

Furthermore, a protecting operation starting time of the protecting operation unit 60 is set so that the motor driving control apparatus 1 does not start the protecting operation until the braking operation in the operation mode B is ended. The protecting operation starting time is a time period time from the time when the brake control signal is generated to the time when the protecting operation unit 60 starts the protecting operation, and, for example, can be set appropriately by adjusting the time constant in the time-constant circuit provided in the initiating time setting unit 61. With this configuration, because the braking operation in the operation mode B is not interrupted by the protecting operation of the protecting operation unit 60, the braking operation in the operation mode B can be performed appropriately.

An operation sequence performed by the protecting operation unit 60 in the motor driving control apparatus 1 will now be explained with reference to FIG. 4. FIG. 4 is a flowchart for explaining an example of the operation sequence performed by the protecting operation unit 60 in the motor driving control apparatus 1. Explained in FIG. 4 is an operation performed by the motor driving control apparatus 1 when the motor 3 is caused to rotate by an external force applied to the motor 3 while there is no power supply to the motor 3.

As illustrated in FIG. 4, when the motor 3 is caused to rotate by an external force applied to the motor 3 while there is no power supply to the motor 3, a counter electromotive voltage (counter electromotive force) is generated in the coil Lw of the motor 3 (Step S101). When the counter electromotive voltage is generated in the coil Lw, the initiating time setting unit 61 in the protecting operation unit 60 rectifies the counter electromotive voltage generated in the coil Lw (Step S102), and smoothes the rectified counter electromotive voltage (Step S103).

When the counter electromotive force is kept being generated in the coil Lw, the smoothed voltage output from the initiating time setting unit 61 rises (Step S104). The protecting operation initiating unit 62 then determines whether the smoothed voltage output from the initiating time setting unit 61 has become equal to or higher than the threshold voltage Vth1 (Step S105). If the smoothed voltage is not equal to or higher than the threshold voltage Vth1 (No at Step S105), the protecting operation initiating unit 62 keeps the detection at Step S105.

If the smoothed voltage output from the initiating time setting unit 61 is equal to or higher than the threshold voltage Vth1 (Yes at Step S105), the switching element Q7 in the protecting operation initiating unit 62 is switched ON, and the protecting operation initiating unit 62 outputs an initiating signal of the protecting operation (brake OFF) (Step S106). When the initiating signal is output from the protecting operation initiating unit 62, the switching element Q8 in the brake OFF command unit 63 is switched ON (Step S107), and the switching element SW1 in the first brake control circuit 43 is switched ON (Step S108). As a result, the brake control unit 30 stops outputting the brake control signal, and the interphase short-circuiting unit 40 releases short-circuiting the coils, to switch the braking operation OFF (Step S109).

Figure 5:
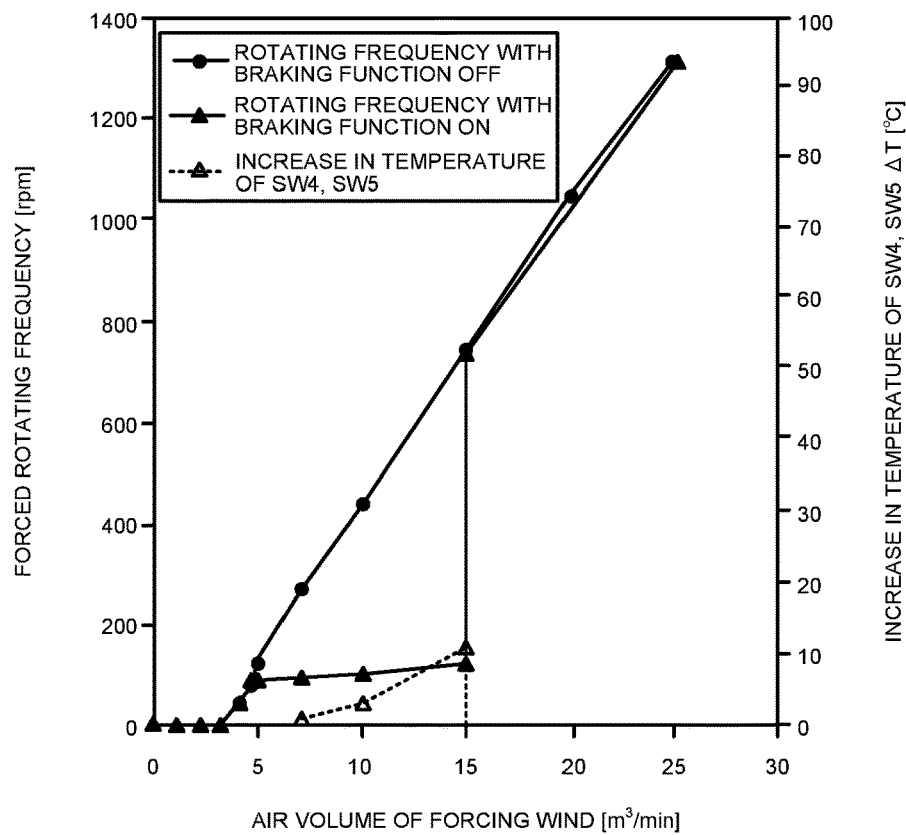
FIG. 5 is a schematic diagram for explaining an example of effects of a protecting operation performed by the motor driving control apparatus according to the first embodiment.

A specific example of effects achieved by the protecting operation performed by the motor driving control apparatus 1 will now be explained with reference to FIG. 5. FIG. 5 is a schematic diagram for explaining an example of the effects of the protecting operation performed by the motor driving control apparatus 1, and illustrates an example in which the motor 3 is forced to rotate, by an external wind hitting a fan attached to the motor 3, while the motor is not being driven. In FIG. 5, the braking function OFF means a condition in which the braking operation of the motor driving control apparatus 1 is disabled (a condition in which the output of the brake control signal is disabled, for example), and the braking function ON means a condition in which the braking operation of the motor driving control apparatus 1 is enabled (a condition in which the output of the brake control signal is enabled, for example).

As illustrated in FIG. 5, when the braking function is OFF, a rotating frequency increases direct-proportionally to the air volume of the external wind. By contrast, with the rotating frequency with the braking function ON, the motor driving control apparatus 1 starts the braking operation when the air volume of the forcing wind is near 5 [m³/min], and the braking operation of the motor driving control apparatus 1 is kept enabled until the air volume of the forcing wind reaches 15 [m³/min] or so. Such a braking operation causes the short-circuited current Iv, Iu to flow into the switching elements SW4, SW5, and increases the temperature of the switching elements SW4, SW5.

When the air volume of the forcing wind becomes equal to or more than 15 [m³/min], the motor driving control apparatus 1 starts the protecting operation, and the motor driving control apparatus 1 stops the braking operation. Therefore, the short-circuited current Iv Iu no longer flows into the switching elements SW4, SW5, and the temperature of the switching elements SW4, SW5 decreases. In this manner, when the load of the motor 3 increases while there is no power supply to the motor 3, it is possible to reduce the burden of the electronic component that is responsible for the not-powered regenerative braking function.

In FIG. 5, the air volume of the forcing wind and the forced rotating frequency at which the protecting operation is started are merely one example, and are not limited to the example illustrated in FIG. 5. The timing at which the protecting operation is started changes depending on the rotating frequency, the number of windings, the shape of an impellor, or the like, in the motor 3.

In the first embodiment, because the energy of the counter electromotive force generated in the coil Lw is used as the power source of the braking function and the protecting operation, it is possible to achieve a completely independent not-powered operation without requiring any separate power source such as a battery. In particular, in a configuration in which the motor 3 is installed in a user system as a fan motor, for example, while suppressing the forcible rotation of the motor caused by an external wind, with the braking function and the protecting function, the braking operation is stopped when there is an increase in the load on the electronic component that is responsible for the not-powered regenerative braking function. With this configuration, it is possible to reduce the burdens of the electronic component that is responsible for the not-powered regenerative braking function.

In the first embodiment, no mechanical relay or mechanical switch is required to implement the braking function described above, and it is possible to improve the reliability of the motor driving control apparatus 1 and to extend the product lifetime.

Figure 6:
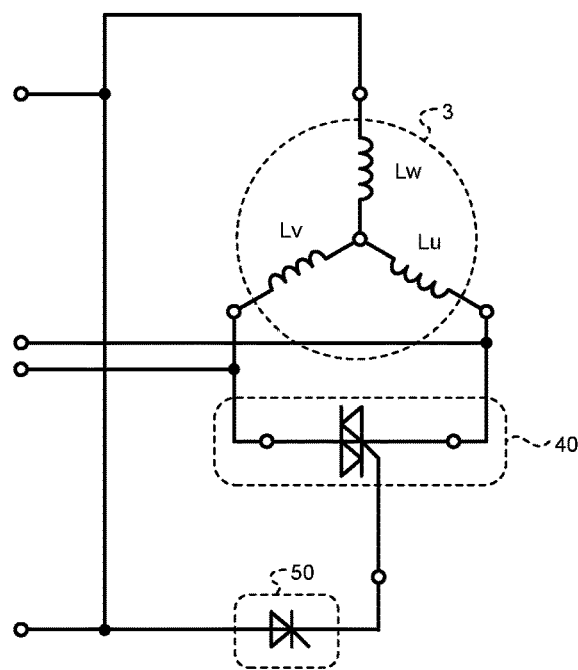
FIG. 6 is a first schematic diagram illustrating a modification of an interphase short-circuiting unit according to the first embodiment.

Furthermore, in FIGS. 1 and 2, the two switching elements SW4, SW5 in the interphase short-circuiting unit 40 are thyristors, but the embodiment is not limited thereto. For example, the interphase short-circuiting unit 40 may be implemented as one triode for alternating current (TRIAC). FIG. 6 is a schematic diagram illustrating a modification of the interphase short-circuiting unit 40 according to such an example. As illustrated in FIG. 6, a TRIAC is disposed between the coils Lu, Lv, and a short-circuiting signal from the short-circuiting signal output unit 50 is input to the gate of the TRIAC. In such a case, the interphase short-circuiting unit 40 does not need to be grounded, and it is not necessary to use the parasitic diodes of the switching elements Q2, Q4, Q6 in the motor driving unit 10 as a regenerative channel. In FIG. 6, the elements of the motor driving control apparatus 1 not required for explanation are not illustrated.

Figure 7:
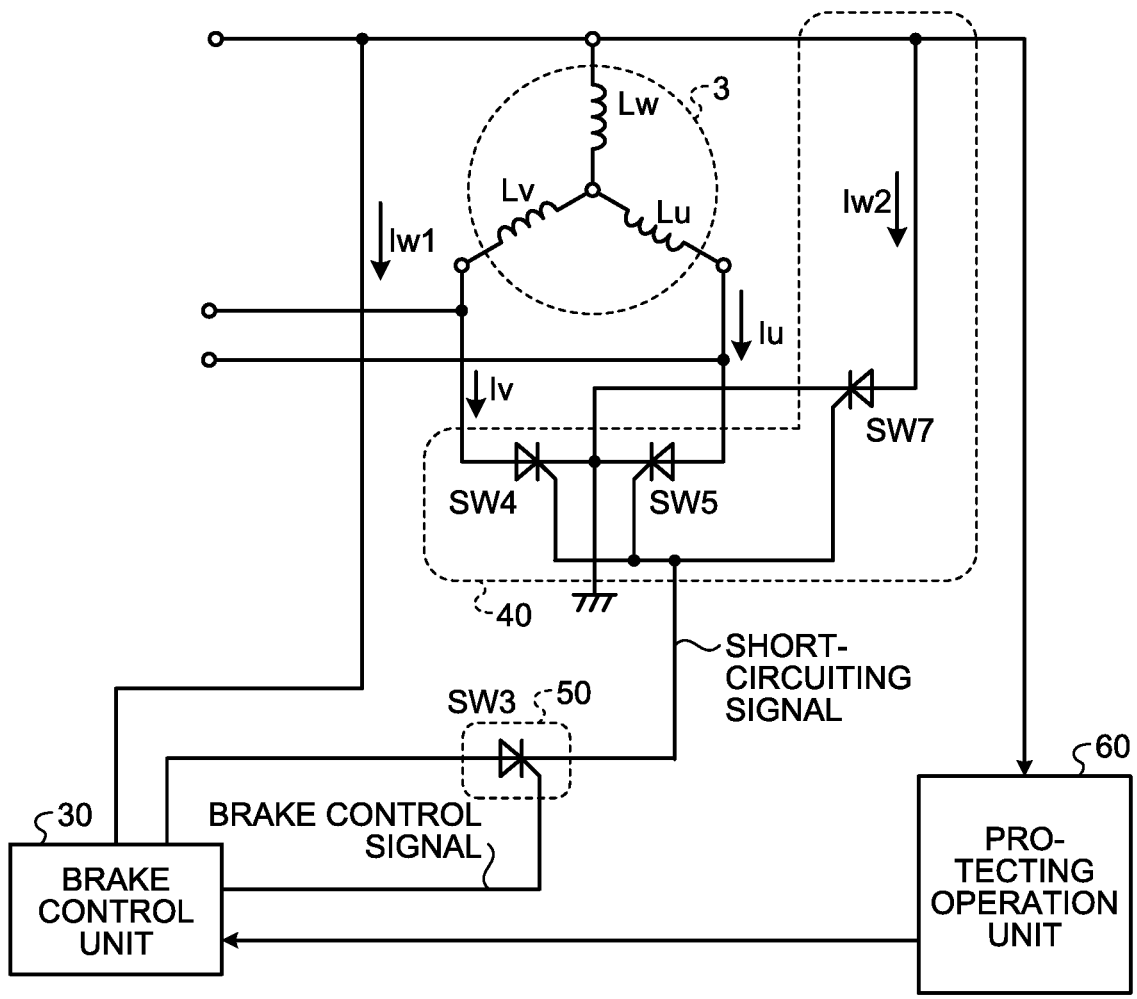
FIG. 7 is a second schematic diagram illustrating a modification of the interphase short-circuiting unit according to the first embodiment.

Furthermore, the interphase short-circuiting unit 40 may also be implemented as three switching elements SW4, SW5, SW7. In such a case, as illustrated in FIG. 7, a switching element SW7 that is connected to the coil Lw is added to the interphase short-circuiting unit 40, in addition to the elements illustrated in FIG. 1. The switching element SW7 is a thyristor, and a short-circuiting signal from the short-circuiting signal output unit 50 is input to the gate of the switching element SW7. Current Iw1 is used in detecting a counter electromotive force, and outputting the brake control signal and the short-circuiting signal. Short-circuited current Iw2 is current that flows into the switching element SW7 when a positive counter electromotive force is generated in the coil Lw.

Therefore, in the interphase short-circuiting unit 40 illustrated in FIG. 7, the coils Lu, Lw or the coils Lv, Lw are short-circuited even when the voltage of the coil Lw becomes positive, and the voltage of any of the coils Lu, Lv becomes negative. In this manner, the interphase short-circuiting unit 40 may be configured to be connected to the three-phase coils Lu, Lv, Lw, and to short-circuit the coils in each of three pairs that are different combinations of two coils of the three-phase coils Lu, Lv, Lw, in response to a short-circuiting signal. In such a case, the protecting operation unit 60 is connected to a one-phase coil of the three-phase coils Lu, Lv, Lw.

Furthermore, although the interphase short-circuiting unit 40 illustrated in FIG. 6 has a configuration including one TRIAC, a configuration including three TRIACs is still possible. In such a case, each of the three TRIACs is disposed between the coils Lu, Lw and the coils Lv, Lw, in addition to between the coils Lu, Lv, in the interphase short-circuiting unit 40. A short-circuiting signal from the short-circuiting signal output unit 50 is then input to the gates of the three TRIACs. With this configuration, it is possible to short-circuit the coils Lu, Lw and the coils Lv, Lw, in addition to the coils Lu, Lv. In such a case, the protecting operation unit 60 is connected to a one-phase coil of the three-phase coils Lu, Lv, Lw, in the same manner as the configuration illustrated in FIG. 7.

Second Embodiment

A motor driving control apparatus according to a second embodiment is different from the motor driving control apparatus 1 according to the first embodiment in that, when the counter electromotive force generated in a one-phase coil of the three-phase coils becomes equal to or more than a preset value, the motor braking force is suppressed, without the motor braking operation being stopped. In the explanation below, elements having the same functions as those in the first embodiment will be given the same reference signs, explanations thereof will be omitted, and differences with respect to the motor driving control apparatus 1 according to the first embodiment will be mainly explained.

Figure 8:
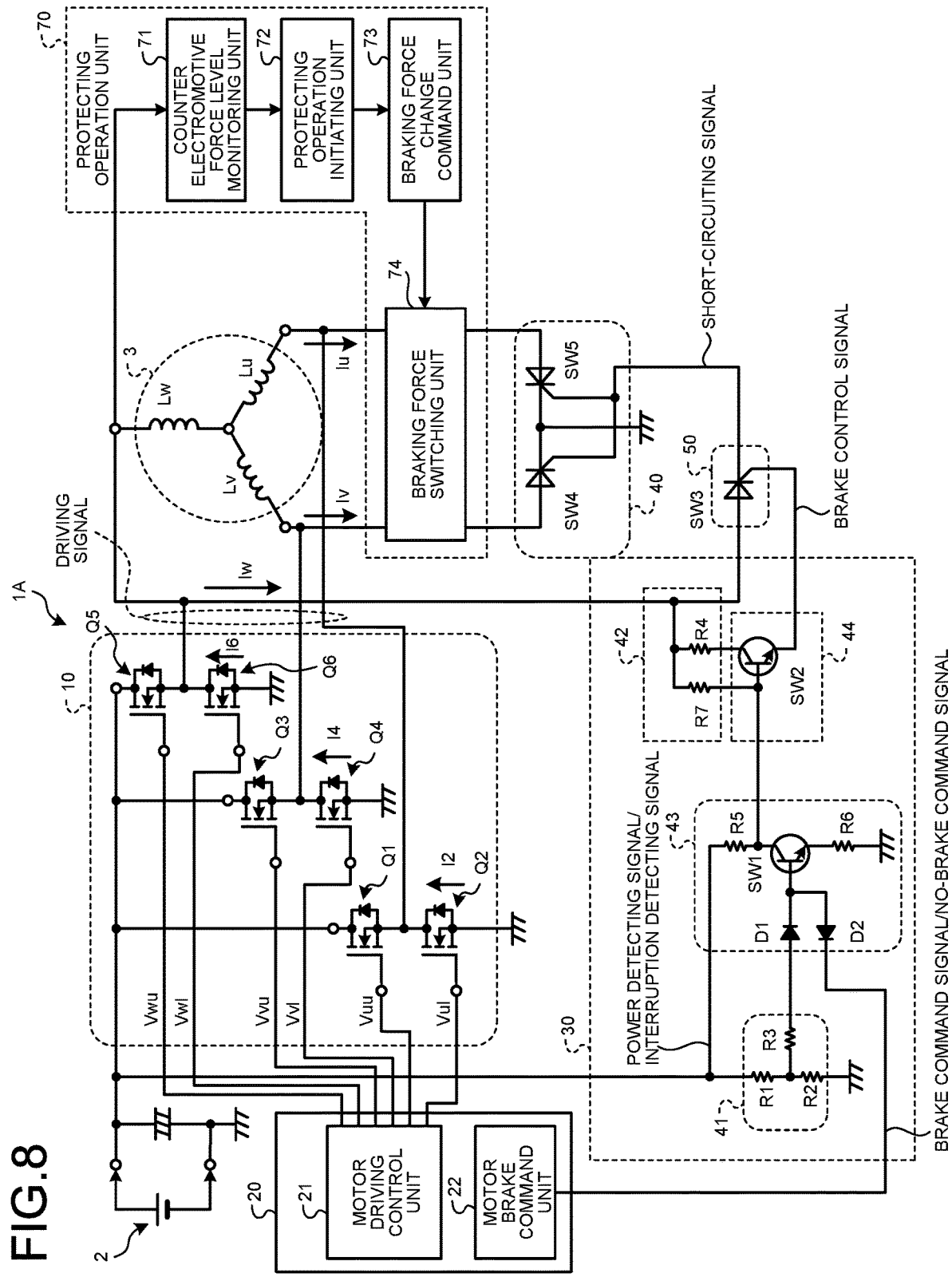
FIG. 8 is a first block diagram illustrating an example of a circuit structure of a motor driving control apparatus according to a second embodiment.

FIG. 8 is a block diagram illustrating an example of a circuit structure of a motor driving control apparatus 1A according to the second embodiment. As illustrated in FIG. 8, the motor driving control apparatus 1A according to the second embodiment includes the motor driving unit 10, the motor control unit 20, the brake control unit 30, the interphase short-circuiting unit 40, the short-circuiting signal output unit 50, and a protecting operation unit 70.

The protecting operation unit 70 suppresses the short-circuited current, being short-circuited by the interphase short-circuiting unit 40, based on a voltage condition of the one-phase coil Lw of the three-phase coils Lu, Lv, Lw. The suppression of the short-circuited current means a reduction in the amount of a current flow resultant of the coils being short-circuited by the short-circuiting signal output unit 50.

The protecting operation unit 70 includes a counter electromotive force level monitoring unit 71, a protecting operation initiating unit 72, a braking force change command unit 73, and a braking force switching unit 74. The counter electromotive force level monitoring unit 71 is connected to the one-phase coil Lw of the three-phase coils Lu, Lv, Lw, and outputs a voltage that is dependent on the level of the counter electromotive force generated in the coil Lw. The protecting operation initiating unit 72 detects as to whether the level of the counter electromotive force generated in the coil Lw is equal to or more than a preset value. For example, the protecting operation initiating unit 72 outputs an initiating signal of a protecting operation (braking force changing) to the braking force change command unit 73 when the voltage output from the counter electromotive force level monitoring unit 71 reaches a preset threshold voltage Vth2. When the initiating signal is output from the protecting operation initiating unit 72, the braking force change command unit 73 outputs a braking force changing signal for causing the braking force switching unit 74 to suppress the short-circuited current, to the brake control unit 30. When the braking force change command unit 73 outputs a braking force changing signal, the braking force switching unit 74 is caused to suppress the braking force applied by the interphase short-circuiting unit 40 to the motor 3, by suppressing the short-circuited current generated as a result of the coils being short-circuited by the short-circuiting signal output unit 50.

Figure 9:
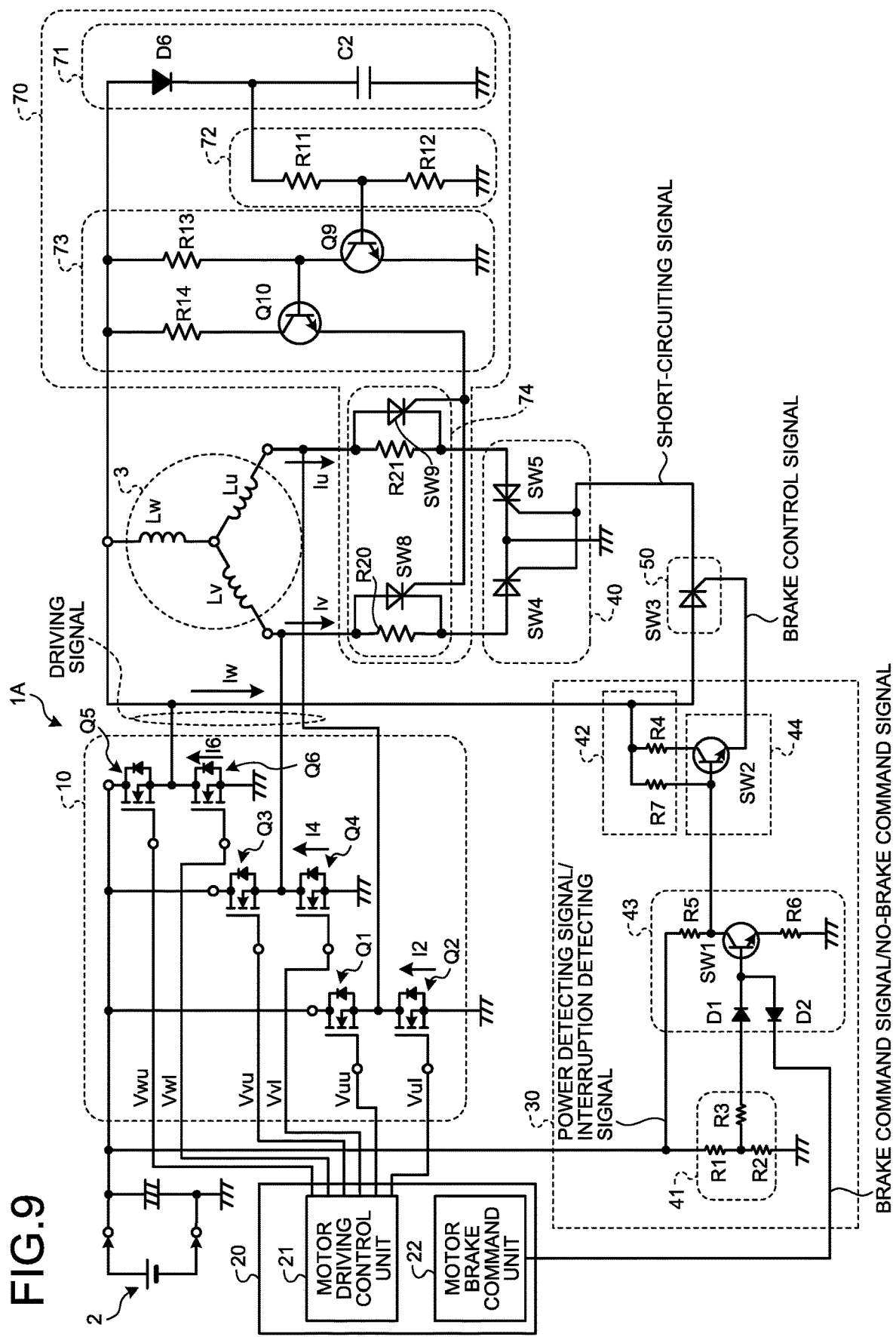
FIG. 9 is a second block diagram illustrating an example of the circuit structure of the motor driving control apparatus according to the second embodiment.

FIG. 9 is a block diagram illustrating an example of a circuit structure of the motor driving control apparatus 1A according to the second embodiment, and illustrates one example of configurations of the counter electromotive force level monitoring unit 71, the protecting operation initiating unit 72, the braking force change command unit 73, and the braking force switching unit 74. As illustrated in FIG. 9, the counter electromotive force level monitoring unit 71 includes a diode element D6 and a capacitor C2. The anode of the diode element D6 is connected to the coil Lw, and the cathode is connected to one end of the capacitor C2. The other end of the capacitor C2 is grounded. The counter electromotive voltage (counter electromotive force) generated in the coil Lw of the motor 3 is rectified by the diode element D6, and the capacitor C2 smoothes the rectified counter electromotive voltage. The smoothed voltage at both ends of the capacitor C2 rises as the counter electromotive voltage (counter electromotive force) increases.

The protecting operation initiating unit 72 includes a serial circuit of resistor elements R11, R12 that are connected in parallel with the capacitor C2 in the counter electromotive force level monitoring unit 71. The smoothed voltage output from the counter electromotive force level monitoring unit 71 is divided based on the resistance of the resistor elements R11, R12. The protecting operation initiating unit 72 outputs an initiating signal of the protecting operation (braking force changing) when the smoothed voltage becomes equal to or higher than the threshold voltage Vth2.

The braking force change command unit 73 includes resistor elements R13, R14 and switching elements Q9, Q10. One end of the resistor element R13 and one end of the resistor element R14 are connected to the coil Lw. The other end of the resistor element R13 is connected to one end of the switching element Q9, and the other end of the resistor element R14 is connected to one end of the switching element Q10. The other end of the switching element Q9 is grounded, and a control terminal is connected to the protecting operation initiating unit 72. When the protecting operation initiating unit 72 outputs the initiating signal to the control terminal of the switching element Q9, the switching element Q9 is switched ON. The initiating signal described above is a voltage signal at a level equal to or higher than the ON voltage of the switching element Q9, and the threshold voltage Vth2 mentioned above is expressed as Vth$2=V_{BE}\times$ (R11+R12)/R12, denoting the ON voltage of the switching element Q9 as $V_{BE}$. By setting the threshold voltage Vth2 higher than the smoothed voltage that is output from the counter electromotive force level monitoring unit 71 when the highest rated voltage is output from the motor driving unit 10, it is possible to prevent the switching element Q9 from being switched ON when the motor driving unit 10 drives the motor 3.

While a counter electromotive force is being generated in the coil Lw, if the switching element Q9 is OFF, the switching element Q10 remains ON, and the switching element Q10 outputs a braking force unchanging signal. The braking force unchanging signal is a signal for applying a voltage to the braking force switching unit 74. Once the switching element Q9 is switched ON, the switching element Q10 is switched OFF. Therefore, the braking force changing signal is output from the switching element Q10. The braking force changing signal is a signal for stopping the application of the voltage to the braking force switching unit 74.

The braking force switching unit 74 includes a parallel circuit of a switching element SW8 and a resistor element R20, and a parallel circuit of a switching element SW9 and a resistor element R21. The parallel circuit of the switching element SW8 and the resistor element R20 is connected between the coil Lv and the anode of the switching element SW4. The parallel circuit of the switching element SW9 and the resistor element R21 is connected between the coil Lu and the anode of the switching element SW5.

The switching element Q10 included in the braking force change command unit 73 keeps outputting a braking force unchanging signal until a braking force changing signal is output from the switching element Q10, and the switching elements SW8, SW9 are kept ON. In this configuration, the short-circuited current Iv, Iu flows into the interphase short-circuiting unit 40 via the switching elements SW8, SW9, respectively. Once the braking force changing signal is output from the switching element Q10, the switching elements SW8, SW9 are switched OFF, and the short-circuited current Iv, Iu flows into the interphase short-circuiting unit 40 via the resistor elements R20, R21, respectively. Therefore, when the braking force changing signal is output from the switching element Q10, the short-circuited current Iv, Iu and the short-circuited current I2, I4, I6 are suppressed, compared with the case when the braking force changing signal is not output from the switching element Q10. Therefore, the braking force applied by the interphase short-circuiting unit 40 to the motor 3 is suppressed.

In the manner described above, the protecting operation unit 70 suppresses the braking force applied by the interphase short-circuiting unit 40 to the motor 3 when the counter electromotive force generated in the coil Lw becomes equal to or more than a preset value. With this configuration, in a condition where there is a large external force that rotates the motor 3, for example, it is possible to protect the interphase short-circuiting unit 40 and the parasitic diodes of the switching elements Q2, Q4, Q6 from suffering from an excessive amount of load resultant of the regenerative braking.

The protecting operation unit 70 is not limited to the configuration illustrated in FIG. 9, and may be configured in any way as long as the protecting operation unit 70 outputs a braking force changing command when the counter electromotive voltage generated in the coil Lw becomes equal to or higher than a specified voltage.

Figure 10:
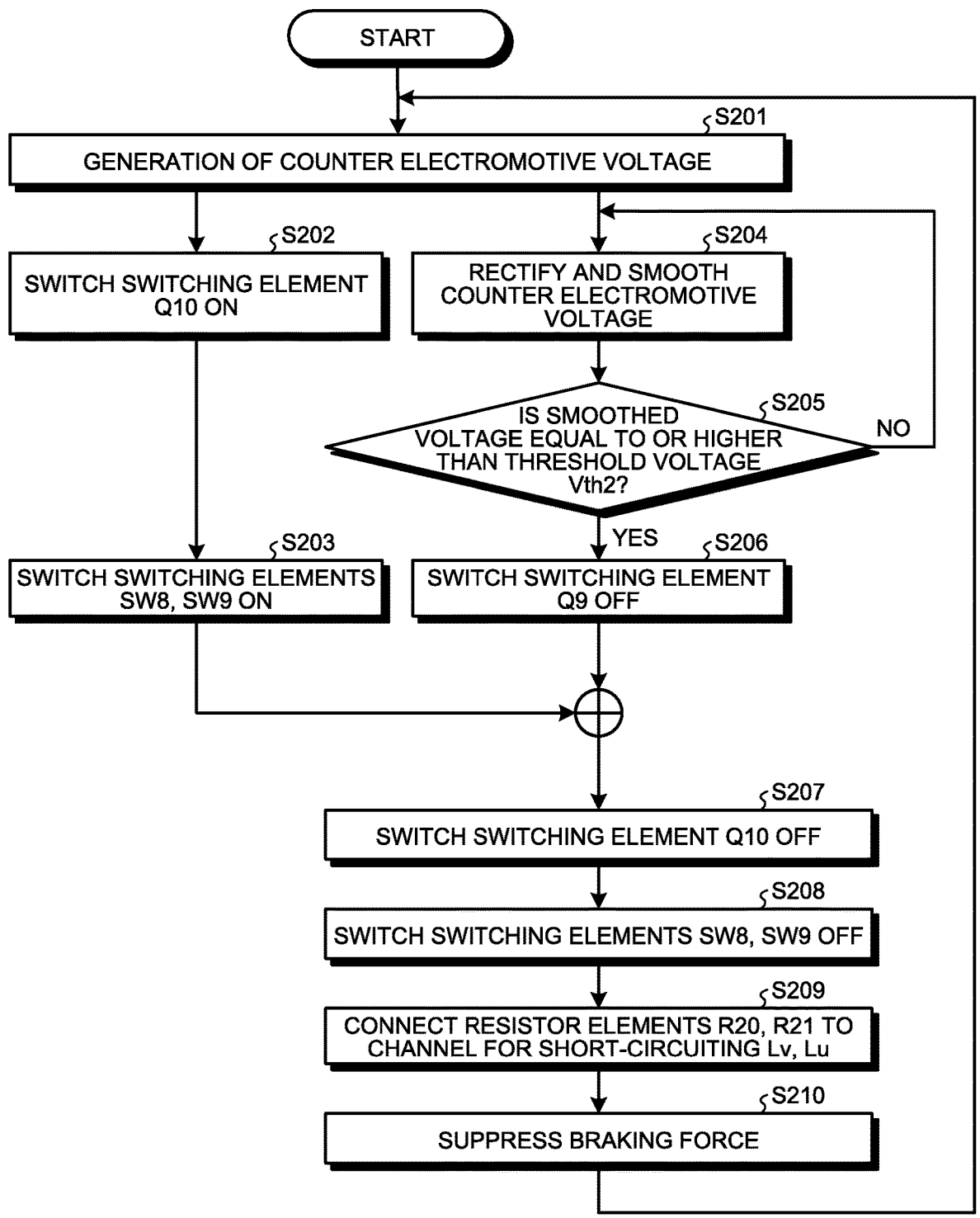
FIG. 10 is a flowchart for explaining an example of an operation sequence performed by a protecting operation unit in the motor driving control apparatus according to the second embodiment.

An operation sequence performed by the protecting operation unit 70 in the motor driving control apparatus 1A will now be explained with reference to FIG. 10. FIG. 10 is a flowchart for explaining an example of the operation sequence performed by the protecting operation unit 70 in the motor driving control apparatus 1A according to the second embodiment. Explained in FIG. 10 is an operation performed by the motor driving control apparatus 1A when the motor 3 is caused to rotate by an external force applied to the motor 3 while there is no power supply to the motor 3.

As illustrated in FIG. 10, when the motor 3 is rotated by an external force applied to the motor 3 while there is no power supply to the motor 3, a counter electromotive voltage (counter electromotive force) is generated in the coil Lw of the motor 3 (Step S201). When the counter electromotive voltage is generated in the coil Lw, the switching element Q10 in the braking force change command unit 73 is switched ON (Step S202). Once the switching element Q10 is switched ON, the switching elements SW8, SW9 in the braking force switching unit 74 are switched ON (Step S203).

Furthermore, the counter electromotive force level monitoring unit 71 rectifies the counter electromotive voltage generated in the coil Lw in the motor 3, and smoothes the rectified counter electromotive voltage (Step S204). The protecting operation initiating unit 72 then detects as to whether the smoothed voltage output from the counter electromotive force level monitoring unit 71 is equal to or higher than the threshold voltage Vth2 (Step S205). If the smoothed voltage has not reached a level equal to or higher than the threshold voltage Vth2 (No at Step S205), the protecting operation initiating unit 72 does not output an initiating signal of the protecting operation (braking force changing). If the smoothed voltage reached a level equal to or higher than the threshold voltage Vth2 (Yes at Step S205), the protecting operation initiating unit 72 outputs the initiating signal, and causes the switching element Q9 to be switched OFF (Step S206).

Once the switching element Q9 is switched OFF, the switching element Q10 is also switched OFF (Step S207). Therefore, the switching elements SW8, SW9 in the braking force switching unit 74 are switched OFF (Step S208). Therefore, the resistor elements R20, R21 become connected to the channel for short-circuiting the coils Lv, Lu (Step S209), and the short-circuited current Iv, Iu flows into the interphase short-circuiting unit 40 via the resistor elements R20, R21, respectively. With this configuration, the braking force applied by the interphase short-circuiting unit 40 to the motor 3 is suppressed (Step S210).

In the second embodiment, because the energy of the counter electromotive force generated in the coil Lw is used as the power source of the braking function and the protecting operation, it is possible to achieve a completely independent not-powered operation without requiring any separate power source such as a battery. In particular, in a configuration in which the motor 3 is installed in a user system as a fan motor, for example, while suppressing the forcible rotation of the motor caused by an external wind, with the braking function and the protecting function, the braking force is suppressed when there is an increase in the load on the electronic component that is responsible for the not-powered regenerative braking function. With this configuration, it is possible to reduce the burdens of the electronic component that is responsible for the not-powered regenerative braking function.

Furthermore, in this embodiment, it is possible to improve the reliability of the motor driving control apparatus 1A, and to extend the product lifetime without requiring any mechanical relay or mechanical switch, to implement the braking function described above.

Figure 11:
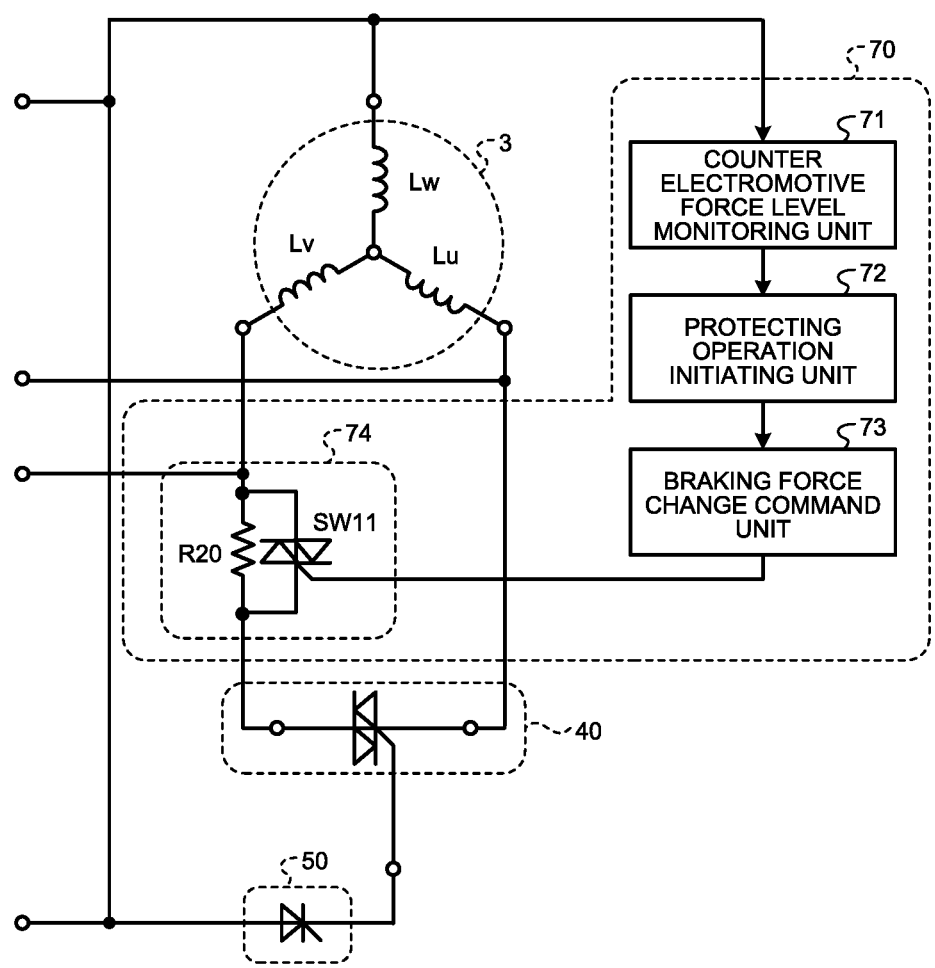
FIG. 11 is a first schematic diagram illustrating a modification of the protecting operation unit and an interphase short-circuiting unit according to the second embodiment.

Furthermore, in FIGS. 8 and 9, the two switching elements SW4, SW5 in the interphase short-circuiting unit 40 are thyristors, but the embodiment is not limited thereto. For example, the interphase short-circuiting unit 40 may be implemented as one TRIAC, as illustrated in FIG. 11. In the example illustrated in FIG. 11, the one TRIAC is disposed between the coils Lu, Lv, and a short-circuiting signal from the short-circuiting signal output unit 50 is input to the gate of the TRIAC. The braking force switching unit 74 in the protecting operation unit 70 includes a parallel circuit of a switching element SW11 and a resistor element R20. The parallel circuit of the switching element SW11 and the resistor element R20 is disposed between the coil Lv and the interphase short-circuiting unit 40, and the switching element SW11 is a TRIAC. Alternatively, the braking force switching unit 74 may be disposed between the coil Lu and the interphase short-circuiting unit 40. Furthermore, it is also possible for the switching element SW11 not to be a TRIAC.

Figure 12:
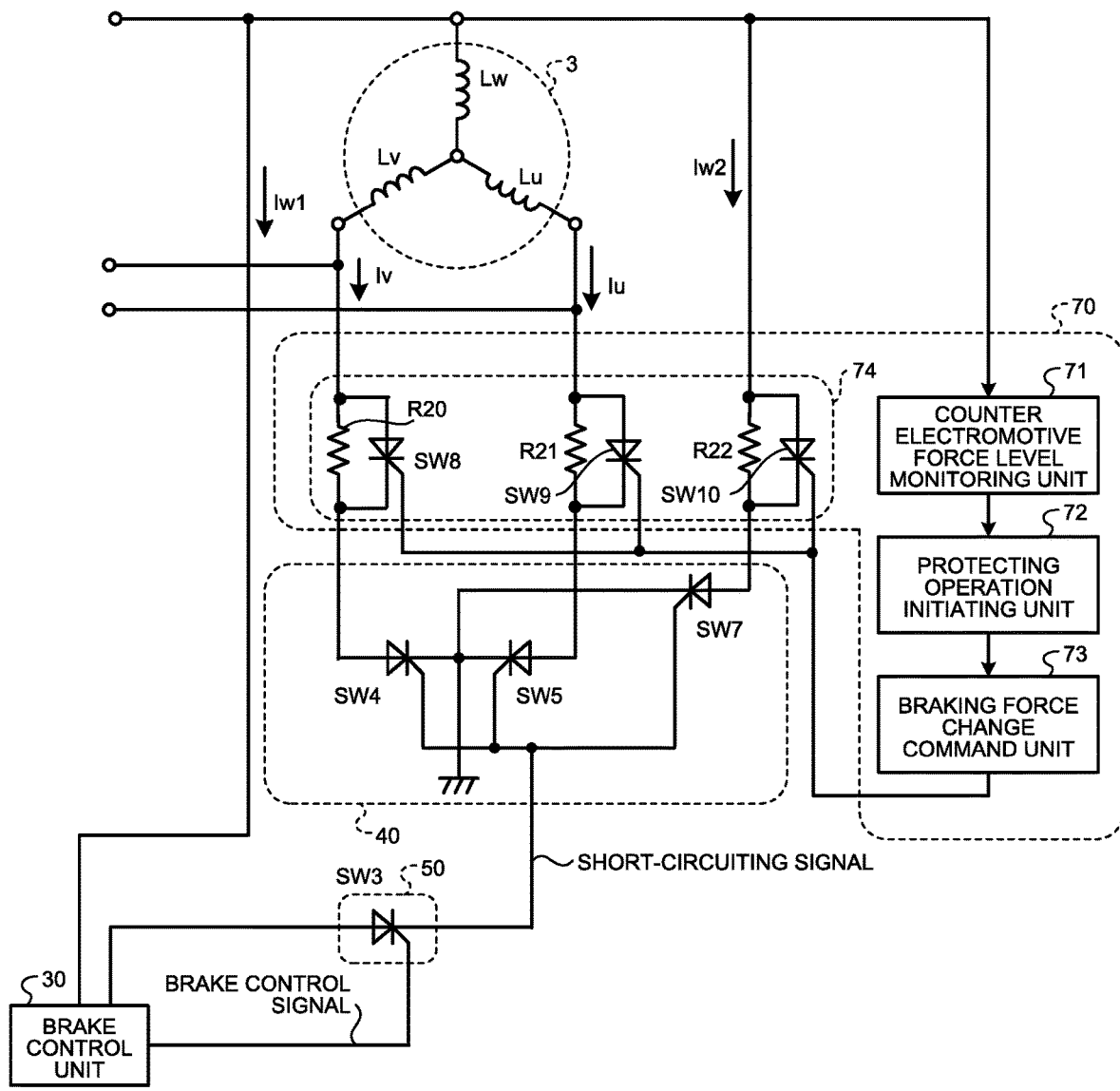
FIG. 12 is a second schematic diagram illustrating a modification of the protecting operation unit and the interphase short-circuiting unit according to the second embodiment.

Furthermore, the interphase short-circuiting unit 40 may also be implemented as three switching elements SW4, SW5, SW7. In such a case, as illustrated in FIG. 12, in addition to the elements illustrated in FIG. 8, the switching element SW7 connected to the coil Lw is added to the interphase short-circuiting unit 40. The switching element SW7 is a thyristor, and a short-circuiting signal from the short-circuiting signal output unit 50 is input to the gate of the switching element SW7. In such a case, the braking force switching unit 74 includes a parallel circuit of a switching element SW10 and a resistor element R22 disposed between the coil Lw and the switching element SW7, in addition to the elements illustrated in FIG. 8. In the configuration illustrated in FIG. 12, the protecting operation unit 70 is connected to a one-phase coil of the three-phase coils Lu, Lv, Lw.

Furthermore, the interphase short-circuiting unit 40 illustrated in FIG. 11 has a configuration including one TRIAC, but may have a configuration including three TRIACs, in the same manner as in the first embodiment. In such a case, the parallel circuit of a switching element that is a TRIAC, and a resistance is serially connected to the TRIACs in the interphase short-circuiting unit 40. In such a case, the protecting operation unit 70 is connected to a one-phase coil of the three-phase coils Lu, Lv, Lw, in the same manner as in the configuration illustrated in FIG. 12.

Furthermore, in this embodiment, it is possible to improve the reliability of the motor driving control apparatus 1A, and to extend the product lifetime without requiring any mechanical relay or mechanical switch, to implement the braking function described above.

Furthermore, in the configuration of the units included in the motor driving control apparatus 1, 1A and the configuration of the motor 3 according to the embodiment, the coils Lu, Lv, Lw have a star connection, but the connection of the coils Lu, Lv, Lw in the motor 3 may also be a delta connection. Furthermore, the TRIAC may be replaced with a bidirectional switch such as a photo-metal-oxide-semiconductor (MOS) relay or a mechanical relay.

Furthermore, the protecting operation unit 60 in the motor driving control apparatus 1 according to the embodiment is explained to operate while the brake control signal is being output from the brake control unit 30, but the embodiment is not limited thereto. For example, the protecting operation unit 60 may be enabled to operate when a certain length of time elapses from when the motor driving control apparatus 1 transits from the operation mode A or the operation mode B to the operation mode C.

Furthermore, in the motor driving control apparatus 1A according to the embodiment, the threshold voltage Vth2 is set to a level not causing the protecting operation unit 70 to perform the protecting operation at the output voltage of the motor driving unit 10, but the embodiment is not limited thereto. For example, it is possible to configure the protecting operation unit 70 to operate while the brake control signal is being output from the brake control unit 30, in the same manner as the protecting operation unit 60, or to operate when a certain length of time elapses from when the motor driving control apparatus 1A transits to the operation mode C, and to configure the threshold voltage Vth2 lower than that used in the example described above.

Furthermore, the protecting operation unit 60 in the motor driving control apparatus 1 according to the embodiment stops the braking operation of the interphase short-circuiting unit 40, but may also be configured to suppress the braking operation of the interphase short-circuiting unit 40, in the same manner as the protecting operation unit 70. In such a case, the protecting operation unit 60 has the same circuit as the braking force switching unit 74, and controls the braking force switching unit 74 to suppress the amount of the short-circuited current flowing between the motor 3 and the interphase short-circuiting unit 40, when the voltage that is dependent on the duration and the level of the counter electromotive force generated in the one-phase coil becomes equal to or higher than the threshold voltage Vth1.

Furthermore, the protecting operation unit 70 in the motor driving control apparatus 1A according to the embodiment suppresses the braking force of the interphase short-circuiting unit 40, but may also be configured to stop the braking operation of the interphase short-circuiting unit 40, in the same manner as the protecting operation unit 60. In such a case, it is not necessary for the protecting operation unit 70 to be provided with the braking force switching unit 74, and the protecting operation unit 70 stops the output of a brake control signal from the brake control unit 30 when the counter electromotive force generated in the one-phase coil becomes equal to or more than a preset value.

Furthermore, the motor driving control apparatus 1A according to the embodiment may also include the protecting operation unit 60 according to the first embodiment, in addition to the protecting operation unit 70. With this configuration, the motor driving control apparatus 1A can reduce the burdens of the electronic component that is responsible for the not-powered regenerative braking function, in a condition where there is a large external force that rotates the motor 3, in addition to the condition where application of an external force rotating the motor 3 persists for a long time.

The configurations of the units included in the motor driving control apparatus 1, 1A according to the embodiment are not limited to those illustrated in FIGS. 1, 9, and 10 explained above. For example, the whole or a part of the brake control unit 30 may be implemented using either hardware or software.

Furthermore, the interphase short-circuiting unit 40 in the motor driving control apparatus 1, 1A has a configuration connected to the coils Lu, Lv, but the embodiment is not limited thereto, and the interphase short-circuiting unit 40 may be configured to be connected to the coils Lv, Lw or to the coils Lu, Lw. In a configuration in which the interphase short-circuiting unit 40 is connected to the coils Lv, Lw, the protecting operation unit 60, 70 may be configured to be connected to the coil Lu, and, in the configuration in which the interphase short-circuiting unit 40 is connected to the coils Lu, Lw, the protecting operation unit 60, 70 may be connected to the coil Lv.

Furthermore, it is also possible to configure to drive the motor control unit 20 in the motor driving control apparatus 1, 1A with a power source other than the power source 2. In such a case, the motor control unit 20 may be implemented as an IC that is separate from the IC on which the motor driving control apparatus 1, 1A is mounted, for example. By configuring to drive the motor control unit 20 with a power source other than the power source 2, the motor control unit 20 is allowed to output a brake command signal even when there is no power supply from the power source 2.

Furthermore, in the embodiment described above, the motor control unit 20 in the motor driving control apparatus 1, 1A is explained to determine whether to apply brake to the motor 3, but the embodiment is not limited thereto. For example, it is also possible to control the motor driving control apparatus 1, 1A in such a manner that an external device other than the motor control unit 20 applies brake to the motor 3 when a user presses an emergency stop button. In such a case, a terminal for receiving a brake command from the external device is provided to the first brake control circuit 43. As a result, for example, the motor 3 can be forced to stop quickly when it is necessary to stop the motor 3 in case of an emergency.

Furthermore, the short-circuiting signal output unit 50 in the motor driving control apparatus 1, 1A is not limited to the configuration described in the embodiment. The short-circuiting signal output unit 50 may include a component other than the thyristor as an element. For example, the short-circuiting signal output unit 50 may be implemented using a mechanical switch (e.g., a mechanical contact relay). In such a case, it is preferable to use a design taking a long-term reliability into consideration, with a countermeasure for defective contact, for example.

Furthermore, the embodiment described above is not intended to limit the scope of the present invention in any way. Configurations including some combinations of the elements, being combined as appropriate, still fall within the scope of the present invention. Furthermore, it is possible for those skilled in the art to come up with any other additional effects and modifications easily. Therefore, a broader scope of the present invention is not limited to the embodiment described above, and various changes are still possible.

REFERENCE SIGNS LIST

1, 1A motor driving control apparatus
2 power source
3 motor
10 motor driving unit
20 motor control unit
21 motor driving control unit
22 motor brake command unit
30 brake control unit
40 interphase short-circuiting unit
41 power supply interruption detecting circuit
42 counter electromotive force detecting circuit
43 first brake control circuit
44 second brake control circuit
50 short-circuiting signal output unit
60, 70 protecting operation unit
61 initiating time setting unit
62, 72 protecting operation initiating unit
63 brake OFF command unit
71 counter electromotive force level monitoring unit
73 braking force change command unit
74 braking force switching unit
C1, C2 capacitors
Lu, Lv, Lw coils
Q1 to Q10 switching elements
Vuu, Vul, Vvu, Vvl, Vwu, Vwl driving control signals
R1 to R9, R11 to R14, R20 to R22 resistor elements
SW1, SW2, SW6 switching elements (transistors)
SW3, SW4, SW5, SW7 to SW10 switching elements (thyristors)
SW11 switching element (TRIAC)
D1 first diode element
D2 second diode element
D3, D5, D6 diode elements
D4 Zener diode element
Iw, Iw1 current
Iu, Iv, Iw2, I2, I4, I6 short-circuited current

The invention claimed is:

1. A motor driving control apparatus comprising:
a motor driving unit that selectively energizes three-phase coils of a motor;
a motor control unit that switches an energizing phase of the three-phase coils in a predetermined order, the energizing phase being a phase to which the motor driving unit energizes, by outputting a driving control signal to the motor driving unit;
a brake control unit that outputs a brake control signal;
an interphase short-circuiting unit that is connected to at least two-phase coils of the three-phase coils, and that short-circuits at least a pair of coils among three pairs that are different combinations of two coils of the three-phase coils, in response to a short-circuiting signal;
a short-circuiting signal output unit that is connected between a one-phase coil of the three-phase coils and the interphase short-circuiting unit, and that outputs the short-circuiting signal to the interphase short-circuiting unit when an input of the brake control signal is received; and
a protecting operation unit that causes the interphase short-circuiting unit to release short-circuiting the coils, or that suppresses short-circuited current based on a voltage condition of a one-phase coil of the three-phase coils.

2. The motor driving control apparatus according to claim 1, wherein the protecting operation unit stops output of the brake control signal from the brake control unit, based on the voltage condition of the one-phase coil of the three-phase coils.

3. The motor driving control apparatus according to claim 2, wherein
the protecting operation unit comprises:
an initiating time setting unit that outputs a voltage that is dependent on a duration and a level of a counter electromotive force generated in the one-phase coil of the three-phase coils;
a protecting operation initiating unit that outputs an initiating signal when a voltage output from the initiating time setting unit becomes equal to or higher than a preset voltage; and a brake OFF command unit that outputs a brake OFF command for stopping the output of the brake control signal to the brake control unit when the protecting operation initiating unit outputs the initiating signal.

4. The motor driving control apparatus according to claim 1, wherein the protecting operation unit reduces current that flows between at least two-phase coils and the interphase short-circuiting unit, based on the voltage condition of the one-phase coil of the three-phase coils.

5. The motor driving control apparatus according to claim 4, further comprising:
- a braking force switching unit that is connected between the at least two-phase coils and the interphase short-circuiting unit, and that reduces the current;
- a counter electromotive force level monitoring unit that outputs a voltage that is dependent on a level of a counter electromotive force generated in the one-phase coil of the three-phase coils;
- a protecting operation initiating unit that outputs an initiating signal when the voltage output from the counter electromotive force level monitoring unit becomes equal to or higher than a preset voltage; and
- a braking force change command unit that outputs a braking force changing command for causing the braking force switching unit to reduce the current, to the brake control unit when the initiating signal is output from the protecting operation initiating unit.

6. A motor driving control method comprising:
causing a motor driving unit to selectively conduct current to three-phase coils of a motor;
causing a motor control unit to switch an energizing phase of the three-phase coils in a predetermined order, the energizing phase being a phase to which the motor driving unit energizes, by causing the motor control unit to output a driving control signal to the motor driving unit;
causing a brake control unit to output a brake control signal;
causing an interphase short-circuiting unit connected to at least two-phase coils of the three-phase coils to short-circuit at least a pair of coils among three pairs that are different combinations of two coils of the three-phase coils, in response to a short-circuiting signal;
causing a short-circuiting signal output unit connected between a one-phase coil of the three-phase coils and the interphase short-circuiting unit to output the short-circuiting signal to the interphase short-circuiting unit when an input of the brake control signal is received; and
causing a protecting operation unit to cause the interphase to release short-circuiting unit short-circuiting the coils, or to suppress short-circuited current, based on a voltage condition of a one-phase coil of the three-phase coils.

* * * * *

UNITED STATES PATENT AND TRADEMARK OFFICE
CERTIFICATE OF CORRECTION

| | |
|---|---|
| PATENT NO. | : 11,228,261 B2 |
| APPLICATION NO. | : 16/975190 |
| DATED | : January 18, 2022 |
| INVENTOR(S) | : Yamamoto et al. |

It is certified that error appears in the above-identified patent and that said Letters Patent is hereby corrected as shown below:

On the Title Page

Item (30), insert:
--Foreign Application Priority Data
Feb. 28, 2018 (JP)..................................JP2018-035100--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*